United States Patent
D'Alessandro et al.

(10) Patent No.: US 11,647,006 B2
(45) Date of Patent: May 9, 2023

(54) PROTECTING SIGNALING MESSAGES IN HOP-BY-HOP NETWORK COMMUNICATION LINK

(71) Applicant: TELECOM ITALIA S.p.A., Milan (IT)

(72) Inventors: Rosalia D'Alessandro, Turin (IT); Jovan Golic, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 263 days.

(21) Appl. No.: 17/053,443

(22) PCT Filed: Apr. 24, 2019

(86) PCT No.: PCT/EP2019/060447
§ 371 (c)(1),
(2) Date: Nov. 6, 2020

(87) PCT Pub. No.: WO2019/214942
PCT Pub. Date: Nov. 14, 2019

(65) Prior Publication Data
US 2021/0243173 A1  Aug. 5, 2021

(30) Foreign Application Priority Data

May 10, 2018 (IT) .......... 102018000005245

(51) Int. Cl.
*H04L 9/40* (2022.01)
*H04L 9/30* (2006.01)
*H04L 9/32* (2006.01)

(52) U.S. Cl.
CPC .......... *H04L 63/0464* (2013.01); *H04L 9/30* (2013.01); *H04L 9/3239* (2013.01);
(Continued)

(58) Field of Classification Search
CPC ....... H04L 9/30; H04L 9/3239; H04L 9/3247; H04L 63/0464; H04L 63/123; H04L 63/126
See application file for complete search history.

(56) References Cited

U.S. PATENT DOCUMENTS

| | | | |
|---|---|---|---|
| 9,003,182 B2* | 4/2015 | Davis | H04L 9/3247 713/160 |
| 2004/0131188 A1* | 7/2004 | Wang | H04L 9/0866 713/171 |

(Continued)

FOREIGN PATENT DOCUMENTS

WO  WO 2018/138006 A1  8/2018

OTHER PUBLICATIONS

Bethencourt et al., "Ciphertext-Policy Attribute-Based Encryption" [Online], Jun. 4, 2007, [Retrieved on: Sep. 6, 2022], , Retrieved from: < https://ieeexplore.ieee.org/stamp/stamp.jsp?tp=&arnumber=4223236 > (Year: 2007).*

(Continued)

*Primary Examiner* — Eric W Shepperd
(74) *Attorney, Agent, or Firm* — Oblon, McClelland, Maier & Neustadt, L.L.P.

(57) ABSTRACT

In method of protecting signaling messages in a hop-by-hop network communication link between a source node and a destination node, a source node public digital signature verification key and a respective source node private digital signature key associated with said public digital signature verification key are provided to the source node. The source node public digital signature verification key associated with the source node private digital signature key is also provided to the destination node. The source node builds a message including a sequence of Information Elements, and calculates, for each Information Element, an Information Element hash value. The source node also calculates a sequence hash (Continued)

value of a concatenation of the calculated Information Element hash values, and generates a source node digital signature by digitally signing the calculated sequence hash value. An intermediate node receives and forwards the signaling message to the destination node.

19 Claims, 9 Drawing Sheets

(52) U.S. Cl.
CPC .......... *H04L 9/3247* (2013.01); *H04L 63/123* (2013.01); *H04L 63/126* (2013.01)

(56) References Cited

U.S. PATENT DOCUMENTS

| | | | | |
|---|---|---|---|---|
| 2004/0179684 | A1* | 9/2004 | Appenzeller | H04L 9/0861 380/44 |
| 2009/0080658 | A1* | 3/2009 | Waters | H04L 9/3073 380/277 |
| 2011/0096929 | A1* | 4/2011 | Seleznev | H04L 9/0891 380/273 |
| 2012/0124381 | A1* | 5/2012 | Kim | H04L 9/0643 713/176 |
| 2013/0159730 | A1* | 6/2013 | Asim | H04L 9/3255 713/189 |
| 2015/0222605 | A1* | 8/2015 | Ignatenko | H04L 9/3073 713/168 |
| 2016/0212244 | A1* | 7/2016 | Stojanovski | H04L 69/324 |
| 2016/0241404 | A1* | 8/2016 | Shokrollahi | H04L 9/3242 |
| 2020/0267542 | A1* | 8/2020 | Pronk | H04W 12/037 |

OTHER PUBLICATIONS

"Discussion document on IPX security" [Online], Nov. 20, 2017 [Retrieved: Sep. 6, 2022], 3GPP TSG SA WG3 (Security) Meeting #89, Nov. 27-Dec. 1, Retrieved from: < https://www.3gpp.org/ftp/tsg_sa/WG3_Security/TSGS3_89_Reno/Docs/S3-173314.zip > (Year: 2017).*

Korhonen et al., "Diameter AVP Level Security: Keyed Message Digests, Digital Signatures, and Encryption" [Online], Feb. 29, 2016 [Retrieved Sep. 10, 2022], Retrieved from: < https://tools.ietf.org/html/draft-korhonen-dime-e2e-security-03 > (Year: 2016).*

Goyal et al., "Attribute-Based Encryption for Fine-Grained Access Control of Encrypted Data" [Online], Nov. 3, 2006, [Retrieved: Sep. 21, 2022], www.acm.org, Retrieved from: < https://dl.acm.org/doi/pdf/10.1145/1180405.1180418 > (Year: 2006).*

Chen et al. "Combined Pulbic-Key Schemes: The Case of ABE and ABS" [Online], 2012 [Retrieved on: Dec. 8, 2022], ProvSec 2012, Retrieved from: < https://link.springer.com/content/pdf/10.1007/978-3-642-33272-2_5.pdf> (Year: 2012).*

International Search Report and Written Opinion dated Jul. 5, 2019 in PCT/EP2019/060447 filed on Apr. 24, 2019.

GSMA: "IPX network End to end Security Guidelines Draft Version 1.0 Nov. 17, 2017", 3GPP Draft; DESS11_03 IPX Network End to End Security Guidelines V1_0, 3rd Generation Partnership Project (3GPP), Mobile Competence Centre; 650, Route Des Lucioules; F-06921 Sophia-Antipolis Cedex, 2017, XP051380650, Retrieved from the Internet: URL:http://www.3gpp.org/ftp/tsg%5Fsa/WG3%5FSecurity/TSGS3%5F89%5FReno/Docs/[retrieved on Nov. 23, 2017], pp. 1-28.

Korhonen, "Diameter AVP Level Security: Keyed Message Digests, Digital Signatures, and Encryption", Diameter AVP Level Security: Keyed Message Digests, Digital Signatures, and Encryption; draft-korhonen-dime-e2e-security-03.txt, Internet Engineering Task Force, IETF; Standard Working Draft, Internet Society (ISOC) 4, Rue Des Falaises CH-1205 Geneva, 2016, XP015111428, 13 total pages.

Korhonen et al., "Diameter End-to-End Security: Keyed Message Digests, Digital Signatures, and Encryption", Dime WG, IETF#85, 2012, XP055540481, Retrieved from the Internet: URL:https://www.ietf.org/proceedings/85/slides/slides-85-dime-7.pdf [retrieved on Jan. 20, 2019], 13 total pages.

Thanh et al., "Security Considerations for the signaling plane in the 3GPP Evolved Packet Core", EWNS 2011, XP055600284, Retrieved from the Internet: URL:https://wiki.uni-due.de/TdR/images/3/34/01_Secure_signaling_plane_EPC_-_Tran_-TUBerlin.pdf [retrieved on Jun. 27, 2019] 2 total pages.

* cited by examiner

PROTECTING SIGNALING MESSAGES IN HOP-BY-HOP NETWORK COMMUNICATION LINK

BACKGROUND OF THE INVENTION

Field of the Invention

The present invention generally relates to the field of communications, particularly (albeit not limitatively) telecommunications in mobile communication networks like Public Land Mobile Networks (PLMNs). Specifically, the present invention deals with the issues of security of signaling messages in hop-by-hop network communication links between a source node in the network and a destination node in the network and passing through at least one intermediate node, particularly signalling messages in mobile communication networks. Signaling messages are messages used for controlling communications in the mobile communication networks. In particular, signaling messages permit the exchange of information concerning the establishment and the control of a communication (e.g., messages used for voice call setup, sending or receiving a short message service (SMS), data exchange) and the management of the mobile communication network.

Overview of the Related Art

In recent years, communication technology has widely spread in terms of number of users and amount of use of the telecommunication services by the users. Due to such a spread, security of communications in telecommunication networks is an issue of the outmost importance, particularly in mobile communication networks.

The application-layer protocol Diameter is an Authentication, Authorization and Accounting (AAA) protocol that evolved from and replaced the much less capable Remote Authentication Dial-In User Service (RADIUS) protocol. The base version of the AAA Diameter protocol is defined in the Internet Engineering Task Force (IETF) Request for Comments (RFC) 6733. Diameter signalling messages, identified by distinct command codes, deliver data in Information Elements taking the form of Attribute Value Pairs (AVPs).

The Diameter protocol does not have any native integrity or confidentiality protection measures. However, the connections between Diameter peers should be protected on the hop-by-hop basis, possibly by Internet Protocol security (IPsec, a network protocol suite that authenticates and encrypts the packets of data sent over a network) or Transport Layer Security (TLS, cryptographic protocols that provide communications security over a computer network), as stated in RFC 6733. This is due to the fact that Diameter signaling messages go from source to destination via specified intermediate peers which can be authorized to read or modify or delete the signaling messages or insert new ones. This means that the communication links in a Diameter network have an intrinsic hop-by-hop nature and, as such, can be protected in the hop-by-hop manner. Consequently, IPsec or TLS tunnels on the hop-by-hop basis are a natural solution for protecting the communication links in a Diameter network.

Upon this base Diameter protocol, several Diameter Applications have been specified. A Diameter Application is not a real software application but is a protocol itself. Each Diameter Application uses a specific application identifier and specific Diameter messages (i.e., command codes). New AVPs can be also used for delivering specific data.

Several examples of Diameter Applications exist, like the 3GPP (Third Generation Partnership Project) Diameter Applications used to transport signaling messages between different mobile network equipment, like for example over 3GPP S6 and S9 interfaces (discussed below).

Such network equipment can be located in different Public Land Mobile Networks (PLMNs), for example in a home PLMN (i.e., the mobile network to which a mobile equipment user is subscribed) and/or in a visited PLMN (i.e., the mobile network where a mobile equipment user, subscriber of another PLMN, is roaming to), depending on where the mobile equipment user is (i.e., under the home PLMN or under a visited PLMN).

The home PLMN and the visited PLMN are connected via General Packet Radio Service (GPRS) Roaming eXchange (GRX) or IP eXchange (IPX) ecosystem.

The IPX is a global, private, IP network which supports IP interconnect and transport for mobile and fixed operators, as well as Internet service providers, content providers, and other Service Providers. The IPX ecosystem consists of multiple connected IPX Providers with peering agreements operating in open competition, selling interconnect services to Service Providers.

The Diameter signaling messages belonging to the 3GPP Diameter Applications are exchanged between the home PLMN and the visited PLMN within the IPX ecosystem, as shown in FIG. 1, and the reference architecture is described in GSM Association (GSMA) IR.88 "LTE and EPC Roaming Guidelines", v16.0. In FIG. 1, PLMN-A and PLMN-B are two PLMNs connected via the IPX ecosystem. Each PLMN PLMN-A, PLMN-B includes a Home Subscriber Server (HSS), a Mobile Management Entity (MME), a Serving GPRS Support Node (SGSN), a Policy and Charging Rules Function (PCRF), and a Diameter Edge Agent (DEA, a Diameter firewall at the boundary of the PLMN). Interfaces S6a, S6d and S9 are 3GPP standard interfaces between HSS, MME, SGSN, PCRF and DEA. As known to those skilled in art, the 3GPP S6 interface includes the S6a interface, which lies between the HSS and the MME of, e.g., an LTE (Long Term Evolution) PLMN for authentication and authorization (particularly, for transporting subscriber-related data, location information, authentication information), and the S6d interface, which lies between the HSS and the SGSN and is used to retrieve and store mobility-related parameters. Another 3GPP S6 interface is the S6c interface (not shown in FIG. 1), which lies between HSS and central SMS (Short Messaging Service) functions (SMS-GMSC, SMS Router). The S6c interface is specific to SMS when they are used in conjunction with the "SMS in MME" architecture specified in 3GPP TS 23.272 or for SGSN supporting EPS (Evolved Packet System) interfaces and it is not mandatory to implement in a mobile network. The 3GPP S9 interface lies between the PCRFs of the home PLMN and of the visited PLMN.

As mentioned in the foregoing, the Diameter protocol security is based on the security of the lower layers in the protocol stack (i.e., it is based on the usage of IPsec/TLS). However, the usage of the IPsec/TLS scenario does not provide an End-to-End (E2E) security between the PLMNs within the IPX ecosystem but only a "hop-by-hop" security. As shown in FIG. 2, an IPsec/TLS tunnel shall be established with the next hop in the communication link, in order to permit the correct Diameter message routing, like the IPsec/TLS tunnel between the (DEA of the) first PLMN PLMN-A and the IPX Service Provider 1 (particularly, the Diameter Routing Agent—DRA—of IPX Service Provider 1), the IPsec/TLS tunnel between the (DRA of) IPX Service Provider 1 and the (DRA of) IPX Service Provider 2, and the IPsec/TLS tunnel between the (DRA of) IPX Service Provider 2 and the (DEA of the) second PLMN PLMN-B.

The same approach (but using a different signaling protocol based on Hypertext Transfer Protocol (HTTP) 2.0 as a carrier) will be also used in signaling networks of the upcoming fifth-generation (5G) wireless systems.

Multi-context TLS (mcTLS), described for example in D. Naylor, K. Schomp, M. Varvello, I. Leontiadis, J. Blackburn, D. Lopez, K. Papagiannaki, P. R. Rodriguez, and P. Steenkiste, "Multi-Context TLS (mcTLS): Enabling Secure In-Network Functionality in TLS," in *Special Interest Group on Data Communication* (SIGCOMM) '15, London, 2015, pp. 199-212, is a transport layer protocol building on top of TLS that enables the so-called trusted middleboxes, implemented in hardware or software, to be introduced in IP networks as trusted entities between the endpoints of communications sessions. mcTLS breaks the current \all-or-nothing" security model by allowing endpoints and content providers to explicitly introduce middleboxes in secure end-to-end sessions while controlling which parts of the data they can read or write.

US 2005/0235065 A1 discloses methods, network elements, and a system for providing security of a session between a client of a domain of a network and a service node of said network, which network consists of a plurality of domains, from which domain a user connected to said network via said client requests a service. The providing of security is based on analyzing a message, which is associated with said session and destined for said client, in terms of routing information.

SUMMARY OF THE INVENTION

The Applicant has observed that the fact that the usage of the IPsec/TLS scenario only provides a hop-by-hop security is a limit and represents a problem under the security viewpoint due to the reasons discussed below.

Firstly, in the IPX ecosystem the authentication occurs between the intermediate nodes on the hop-by-hop basis, and not between the real sender and the real receiver of a signalling message.

Secondly, due to the hop-by-hop routing nature of the Diameter protocol, a Diameter response always follows the same path as the Diameter request, making the Diameter protocol a "spoofing friendly" protocol, potentially vulnerable to man-in-the-middle attacks.

Thirdly, the threat landscape is changing rapidly and attackers will get more interest in the Diameter protocol. For instance, if it gets harder to obtain the IMSI (International Mobile Subscriber Identity) of a PLMN subscriber via Signaling System No. 7 (SS7), attacks will move to Diameter to reach their goals. Additionally, metadata are still present in the Diameter protocol, which allows mass surveillance and location tracking of fourth generation (4G) PLMN and/or fifth generation (5G) PLMN subscribers. The E2E encryption using mobile application does not protect the subscriber against such tracking. This is yet another good reason to protect confidentiality and integrity of the Diameter protocol.

In other words, the Applicant has observed that it would be desirable that the destination PLMN could be able to authenticate the real sender of the Diameter message in order to prevent spoofing, to judge the integrity of the message and to protect from disclosure some sensitive data delivered in the Diameter messages in order to prevent Man-In-The-Middle (MITM) and eavesdropping attacks.

In a real deployment it can happen that a PLMN authorizes the IPX Service Provider with peering agreements in-place, to replace on the fly some AVP data (e.g., the value of the "Origin Realm" AVP, the AVP that contains the Realm of the originator of any Diameter message and that has to be present in all messages) set by the originating (source) PLMN, or to read, without changing, some AVP data (e.g., the AVPs "User-Name"/IMSI, MSISDN), and that an IPX Service Provider is able to add new AVPs (e.g., routing AVPs) to the original Diameter message sent by the source PLMN.

These problems and limits will be also applicable to upcoming 5G signaling networks.

With reference to the paper by D. Naylor et al. mentioned above, the Applicant remarks that access to data by middleboxes is essentially achieved by providing selective access to TLS session keys used for security functionalities in TLS, which can be cumbersome if adapted to IPX. Accordingly, mcTLS is based on classical cryptosystems used in TLS (with public-key certificates or pre-shared keys). Moreover, mcTLS is also not free of drawbacks, in particular it is not suitable for fine-grained access control and it does provide traceable message changes performed by authorized intermediate nodes.

The Applicant has observed that the solution proposed in US 2005/0235065 A1 mainly uses routing information to understand if a message is coming from an expected path. This is a strong assumption since it can happen that an attacker can send illegitimate messages using a valid path. Moreover, the solution proposed in US 2005/0235065 A1 assumes that the requests cannot be generated by a domain (i.e., a Realm) different from the domain (i.e., the Realm) associated to the user. This assumption makes the solution proposed in US 2005/0235065 A1 not applicable to a roaming scenario where the requests are generated for a user not belonging to the domain from which the request is issued. Furthermore, the confidentiality of some data is not addressed.

The Applicant has perceived that the known solutions for protecting signalling messages are not satisfactory.

The Applicant has faced the problem of devising a solution for protecting signalling messages which is not affected by the aforementioned drawbacks.

According to an aspect of the present invention, there is provided a method of protecting signaling messages in a hop-by-hop network communication link between a source node in the network and a destination node in the network, the communication link including at least one intermediate node in the network between the source node and the destination node, the method comprising:

providing the source node with a source node public digital signature verification key and a respective source node private digital signature key associated with said public digital signature verification key;

providing the destination node with said source node public digital signature verification key associated with the source node private digital signature key;

at the source node:

building a signaling message including a sequence of Information Elements;

for each Information Element, calculating an Information Element hash value of the Information Element;

calculating a sequence hash value of a concatenation of the calculated Information Element hash values;

generating a source node digital signature by digitally signing the calculated sequence hash value, said digitally signing comprising exploiting the source node private digital signature key and the source node public digital signature verification key;

including the source node digital signature in the signaling message, and sending the signaling message;

at the intermediate node:

receiving the signaling message and forwarding it to the destination node directly or via a next intermediate node;

at the destination node:

receiving the signaling message.

The method may further comprise:

at the destination node, after said receiving the signaling message:

for each Information Element, calculating an Information Element hash value of the Information Element;

calculating a sequence hash value of a concatenation of the calculated Information Element hash values;

verifying the source node digital signature included in the received signaling message by exploiting said source node public digital signature verification key and the calculated sequence hash value; and in case the source node digital signature is verified as valid, accepting the received signaling message as authentic, otherwise discarding the received signaling message.

In particular embodiments, in said building a signaling message a respective unique index may be assigned to each of said Information Elements, the index assigned to an Information Element being able to identify that Information Element in the sequence. Said calculating an Information Element hash value may include calculating a hash value of the Information Element plus the unique index assigned thereto. Said including the source node digital signature in the signaling message may also include the indexes of all said Information Elements.

Said at least one intermediate node may include a first intermediate node being an intermediate node next to the source node in said hop-by-hop network communication link. The method may further comprise:

providing said first intermediate node with an intermediate node public digital signature verification key and a respective intermediate node private digital signature key associated with said intermediate node public digital signature verification key;

at said first intermediate node, after said receiving and before said forwarding:

for each Information Element, calculating an Information Element hash value of the Information Element;

calculating a sequence hash value of a concatenation of the calculated Information Element hash values;

verifying the source node digital signature included in the received signaling message by exploiting the source node public digital signature verification key and the calculated sequence hash value;

in case the source node digital signature is verified as valid, making a change to the received signaling message, wherein said making a change includes at least one among modifying at least one Information Element in the sequence or adding to the sequence at least one additional Information Element with an associated unique index able to identify the additional Information Element in the sequence, otherwise, if the source node digital signature is not verified as valid, discarding the received signaling message;

calculating a hash value of the change made to the received signaling message, wherein said calculating a hash value of the change includes calculating an individual hash value of each modified and/or additional Information Element plus the associated indexes, and calculating a sequence hash value of a concatenation of the calculated individual hash values;

generating an intermediate node digital signature by digitally signing the calculated hash value of the change by exploiting the intermediate node private digital signature key and the intermediate node public digital signature verification key;

including the generated digital signature of the hash value of the change in the signaling message, together with the indexes of the modified and/or additional Information Elements;

calculating an individual hash value of the original value of each modified Information Element; and including in the signaling message data useful to assess the integrity of the signaling message before the change, said data comprising the individual hash value of the original value of each modified Information Element.

In embodiments, said at least one intermediate node may include, in addition to said first intermediate node, a second intermediate node next to a preceding intermediate node in said hop-by-hop network communication link. The method may further comprise:

providing said second intermediate node with the source node public digital signature verification key and the public digital signature verification keys of all the previous intermediate nodes in said hop-by-hop network communication link;

providing said second intermediate node with an intermediate node public digital signature verification key and an intermediate node private digital signature key associated with said intermediate node public digital signature verification key;

at said second intermediate node, after said receiving and before said forwarding:

a) extracting from the received signaling message all said generated digital signatures together with all said indexes of the modified and/or additional Information Elements respectively associated with said generated digital signatures, wherein said digital signatures have been generated by said previous intermediate nodes in said hop-by-hop network communication link and by the source node;

b) extracting from the received signaling message said data useful to assess the integrity of the signaling message before the change, for each said digital signature of the hash value of the change in the signaling message generated by a previous intermediate node;

c) for each Information Element in the received signaling message with an index associated with the last generated digital signature, calculating an Information Element hash value of the Information Element;

d) calculating the last hash value of the change, as the hash value of a concatenation of the calculated Information Element hash values;

e) verifying said last generated digital signature included in the received signaling message by exploiting the respective previous intermediate node public digital signature verification key and said last hash value of the change;

f) for each modified Information Element in the received signaling message with an index associated with said last generated digital signature, extracting from said data useful to assess the integrity of the signaling message before the change the individual hash value of the original value of the modified Information Element;

g) calculating a previous hash value of the change, as the hash value of a concatenation of all calculated or extracted Information Element hash values corresponding to the Information Elements with an index associated with a previous, before the last, generated digital signature;

h) verifying said previous, before the last, digital signature included in the received signaling message by exploiting the respective intermediate node or the source node public digital signature verification key and said previous hash value of the change;

i) iterating operations f) to h) for verifying all said generated digital signatures present in the received signaling message;

in case all said generated digital signatures present in the received signaling message are verified as valid, making a change to said received signaling message, wherein said making a change includes at least one among modifying at least one Information Element in the sequence or adding to the sequence at least one additional Information Element with an associated unique index able to identify the additional Information Element in the sequence, otherwise discarding the received signaling message;

calculating a hash value of the change made to the received signaling message, wherein said calculating a hash value of the change includes calculating an individual hash value of each modified and/or additional Information Element plus the associated indexes, and calculating a sequence hash value of a concatenation of the calculated individual hash values;

generating an intermediate node digital signature by digitally signing the calculated hash value of the change by exploiting the intermediate node private digital signature key and the intermediate node public digital signature verification key;

including the generated digital signature of the hash value of the change in the signaling message, together with the indexes of the modified and/or additional Information Elements;

calculating an individual hash value of the original value of each modified Information Element; and including in the signaling message data useful to assess the integrity of the signaling message before the change, said data comprising the individual hash value of the original value of each modified Information Element.

In embodiments, the method may further comprise:

at the destination node, after said receiving the signaling message:

performing the same operations a) to h) performed by the second intermediate node as in claim 5 for verifying all said generated digital signatures present in the received signaling message, by exploiting the public digital signature verification keys of the respective nodes and the respective iteratively calculated said hash values of the changes; and in case all said generated digital signatures are verified as valid, accepting the received signaling message, otherwise discarding the received signaling message.

Advantageously, said generating a digital signature, before said digitally signing, may also comprise concatenating an identity of the signing node to said calculated sequence hash value.

Advantageously, said including in the signaling message data useful to assess the integrity of the signaling message before the change may comprise including in the signaling message an indication of a nature of the change, wherein said indication of the nature of the change is one among an indication of a modification of an Information Element and an indication of the addition of an Information Element.

For example, said indication of a modification of an Information Element may be one among an indication of a modification of the value of an Information Element and an indication of the deletion of an Information Element.

In advantageous embodiments, the source node private digital signature key may have embedded therein a source node attribute set including at least one source node attribute of the source node, particularly an identifier of the source node or an expiry time/date of said private digital signature key, and the source node digital signature may have embedded therein an access policy satisfied by the attribute set embedded in the source node private digital signature key, particularly an access policy including said identifier of the source node or said expiry time/date of said private digital signature key.

In advantageous embodiments, the intermediate node private digital signature key may have embedded therein an intermediate node attribute set including at least one intermediate node attribute of the intermediate node, particularly an identifier of the intermediate node or an expiry time/date of said private digital signature key, and the intermediate node digital signature may have embedded therein an access policy satisfied by the attribute set embedded in the intermediate node private digital signature key, particularly an access policy including said identifier of the intermediate node or said expiry time/date of said private digital signature key.

Preferably, but not limitatively, the private digital signature keys of the source node and the intermediate nodes are all associated with the same public digital signature verification key, according to an Attribute-Based Signature, ABS, scheme, particularly to an Identity-Based Signature, IBS, scheme.

In embodiments, at least one Information Element may contain a modification access policy that needs to be satisfied by a node attributes in order for said node to be authorized to perform a modification of said Information Element and said modification access policy may be compliant with the access policy embedded in the digital signature of said node.

According to another aspect of the invention, a method is provided of protecting signaling messages in a hop-by-hop network communication link between a source node in the network and a destination node in the network, the communication link including at least one intermediate node in the network between the source node and the destination node. The method comprises:

providing the source node and the at least one intermediate node with a public encryption key;

providing the destination node and authorized intermediate nodes among said at least one intermediate node with a private destination node decryption key and respective private intermediate node decryption keys, the decryption keys being associated with the public encryption key, wherein said private decryption key has embedded therein a respective node attribute set including at least one node attribute, particularly an identifier of the node or an expiry time/date of said private decryption key;

at the source node:

encrypting at least one Information Element to obtain an encrypted Information Element, by exploiting the public encryption key and embedding an access policy in said encrypting, and including the encrypted Information Element in the sequence of Information Elements;

at the destination node and said authorized intermediate node:

decrypting the encrypted Information Element exploiting the destination node private decryption key and the respective authorized intermediate node private decryption key, to obtain a decrypted Information Element.

The method may further comprise:

at said authorized intermediate node, after said decrypting the encrypted Information Element exploiting the authorized intermediate node private decryption key:

modifying the decrypted Information Element;

encrypting the Information Element to obtain an encrypted Information Element, by exploiting the public encryption key and embedding an access policy in said encrypting, and including the encrypted Information Element in the sequence of Information Elements;

at the destination node:

decrypting the encrypted modified Information Element exploiting the destination node private decryption key.

The method may still further comprise:

at any intermediate node:

adding a new Information Element;

encrypting the Information Element to obtain an encrypted Information Element, by exploiting the public encryption key and embedding an access policy in said encrypting, and including the encrypted Information Element in the sequence of Information Elements;

at the destination node:

decrypting the encrypted modified Information Element exploiting the destination node private decryption key.

In embodiments, said encrypting and decrypting may comprise calculating a common shared secret key, which is then used for a symmetric-key encryption and respective decryption by exploiting a symmetric-key cipher.

Said public encryption key and associated private decryption keys may be calculated according to an Attribute-Based Encryption, ABE, scheme, particularly to an Identity-Based Encryption, IBE, scheme.

Said ABE and ABS schemes may advantageously exploit the same public key, for encryption and digital signature verification, and wherein the same private keys provided to the nodes can be used for both digital signatures and decryption.

Preferably, said hash values are calculated exploiting cryptographic hash functions.

In embodiments, the signaling message can be a Diameter signaling message, and each of said Information Elements can comprise an Attribute Value Pair, AVP.

BRIEF DESCRIPTION OF THE DRAWINGS

These and other features and advantages of the present invention will be made apparent by the following detailed description of exemplary and non-limitative embodiments thereof. In the following description, reference will be made to the attached drawings, wherein.

DESCRIPTION OF EXEMPLARY
EMBODIMENTS OF THE INVENTION

The present invention proposes a solution for protecting signaling messages (e.g. Diameter messages, 5G signaling messages and so on) exchanged by different PLMNs, e.g., within the IPX ecosystem.

In particular, in embodiments thereof the solution according to the present invention achieves protection of signaling messages by means of a dynamic combined signature and encryption scheme. The scheme proposed in embodiments of the solution according to the present invention can protect sensitive data delivered by signaling messages against the exposure and the unauthorized handling which can lead, e.g., to spoofing, MITM, subscriber Denial of Service (DoS) and eavesdropping attacks. In particular, anti-replay protection, entity authentication, integrity and confidentiality of the signaling messages are guaranteed.

The scheme proposed in embodiments of the solution according to the present invention can be applied at different points in a communication network: inside the communication network, e.g. PLMN, perimeter, at the boundary nodes of the PLMN handling signaling messages (e.g., at a DEA, at a Diameter Firewall) and outside the PLMN perimeter, within the IPX Ecosystem (i.e., at a generic Service Provider node, e.g., an IPX DRA, a Service Hub DRA) if an agreement with this external party (external to the PLMN) is in place allowing the external party to manipulate signaling messages or to access to sensitive data. For this reason, the concept of a circle of trust or a more general trust domain including a PLMN and in general Service Providers operating within the IPX Ecosystem is introduced.

Figure 1:
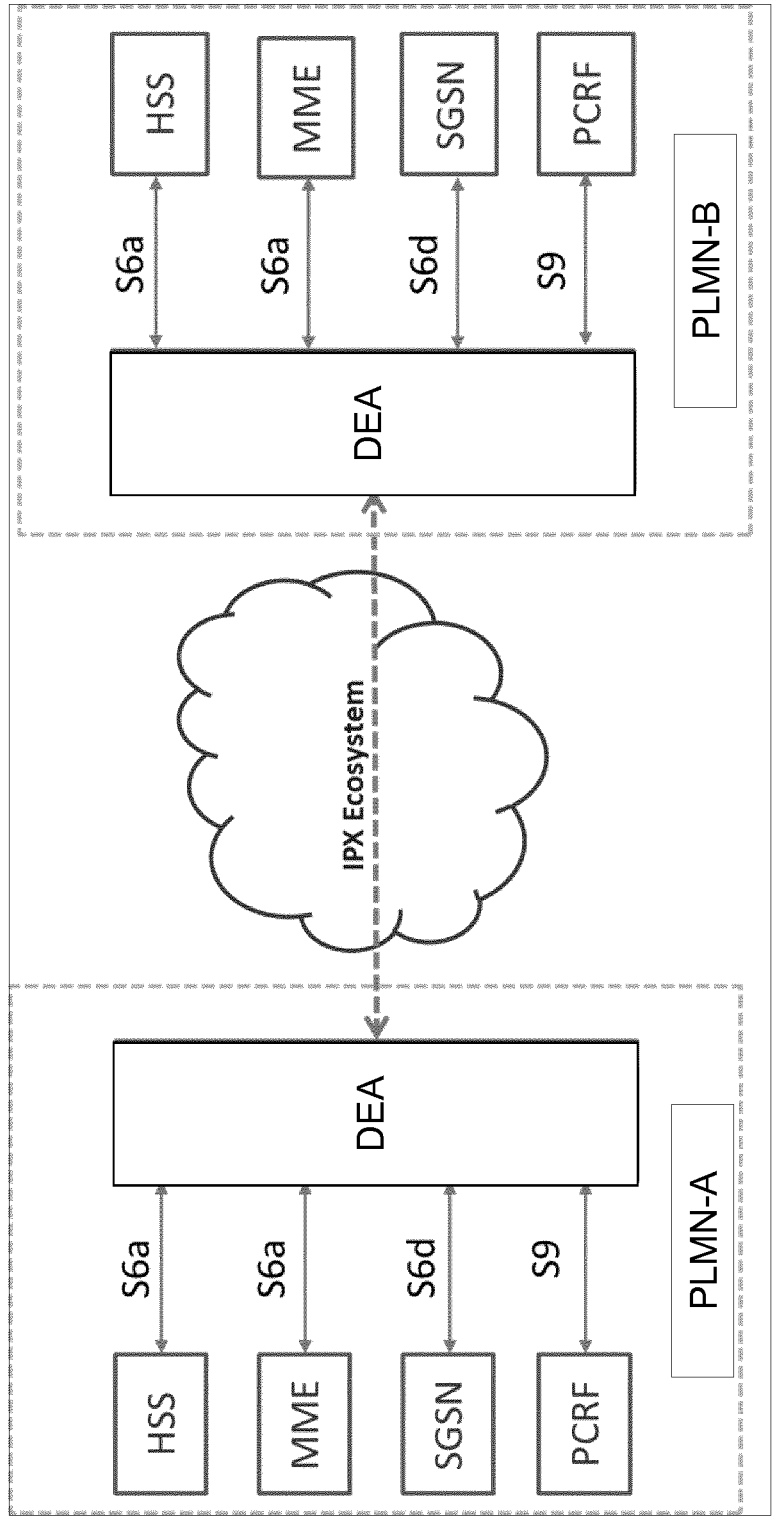
FIG. 1 depicts a known Diameter roaming implementation architecture.
Figure 2:
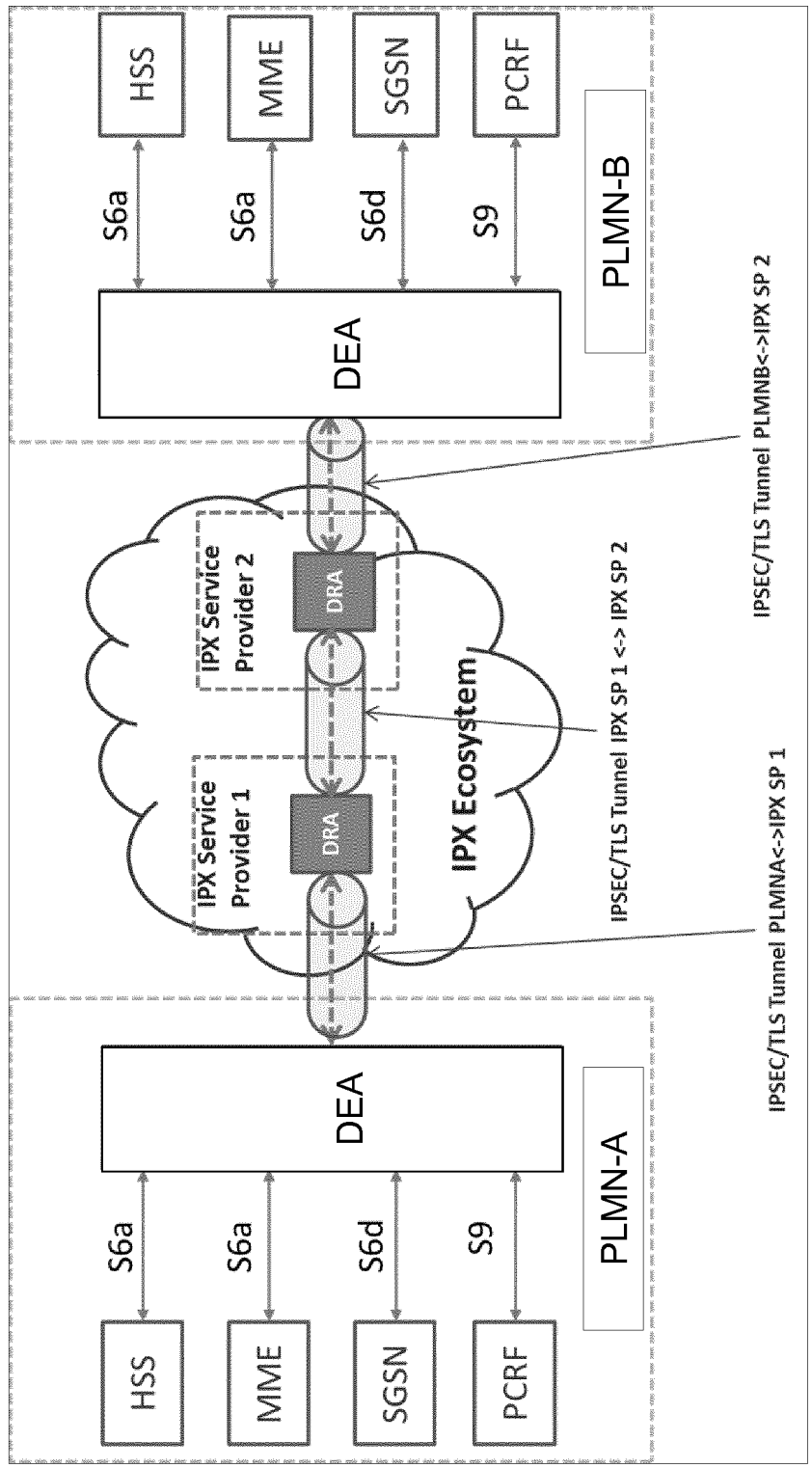
FIG. 2 depicts a known implementation of security in the implementation architecture of FIG. 1.
Figure 3:
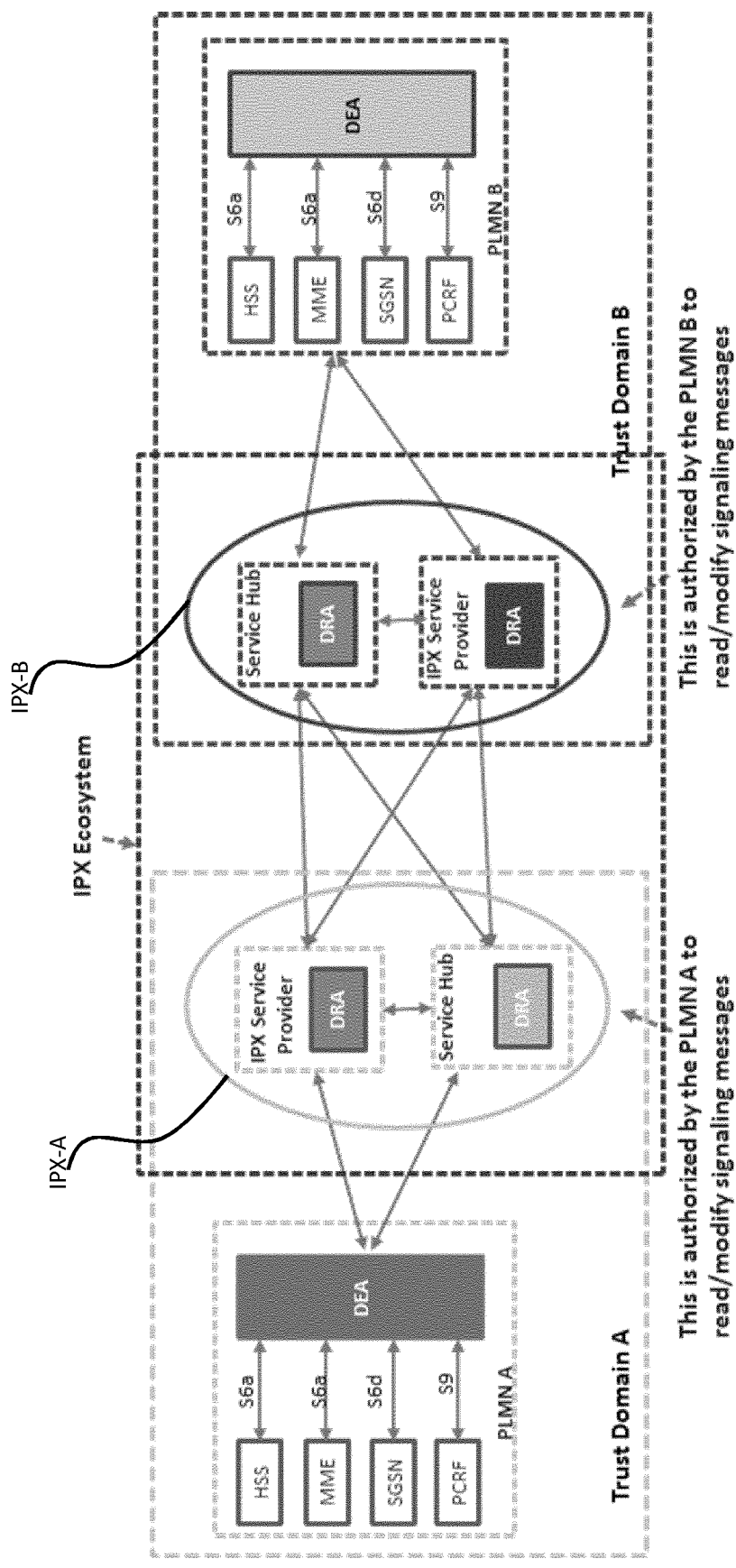
FIG. 3 depicts an example of trust domains in a scenario like that of FIG. 1, according to an embodiment of the present invention.

FIG. 3 depicts an example of trust domains in a scenario like that of FIG. 1. A first trust domain Trust Domain A includes a first PLMN PLMN-A and, within the IPX Ecosystem, a first IPX node IPX-A, including a first IPX Service Provider DRA and a first Service Hub DRA. A second trust domain Trust Domain B includes a second PLMN PLMN-B and, within the IPX Ecosystem, a second IPX node IPX-B, including a second IPX Service Provider DRA and a second Service Hub DRA. The first IPX node IPX-A is authorized by the first PLMN PLMN-A to read/modify signalling messages; the second IPX node IPX-B is authorized by the second PLMN PLMN-B to read/modify signalling messages.

Regardless of the application point in the communication network, in embodiments of the proposed solution, the signature and encryption method works at the application layer and ensures that sensitive data is always exchanged in a protected way and handled only by authenticated and authorized network entities, independently of the transport layer security (e.g., no IPsec/TLS deployment is required).

In embodiments thereof, the proposed solution does not require the deployment of a traditional and complete Public-Key Infrastructure (PKI), which was, in the past, considered too expensive mostly because it implicitly means the issuance and management of public-key certificates, which are digital signatures binding public keys to identities for many Roaming Partners. The certificates are issued by a distributed structure of Certification Authorities (CAs) which need to be trusted for verifying the identities and knowledge of the private key corresponding to the public key in the certificate. Each certificate also contains an expiration date which ensures that the public/private key pair is used during a certain validity period. Typically, public and private keys are used for encryption and decryption, respectively, or for verifying and generating a digital signature, respectively. More particularly, in order to verify a given public-key certificate, certificate chains can be used with the initial certificate in the chain signed by a trusted public key, possibly the root of trust public key belonging to the root CA. In fact, in PKI it takes only one maliciously acting CA to enable issuance of fake certificates and fooling the authentication system. Accordingly, the required trust in the CAs is what makes their implementation expensive and possibly not cost effective.

Differently, the proposed scheme according to embodiments of the present invention, even if still based on a public-key cryptography approach, reduces significantly the complexity and costs of key deployment and management, since the PLMN can handle the key management procedures (including a key revocation procedure). Instead of PKI, the proposed scheme according to embodiments of the present invention uses a single Trusted Authority (TA) implemented as a secure and trustworthy Key Management Server (KMS) or, possibly, a relatively small number of such TAs. In order to reduce the needed trust in individual servers, the KMS can be implemented in a distributed way ensuring both security and robustness, by using a number of independent servers. They should be trusted only not to collude all together, and this can be achieved in practice with a high assurance level.

For a single trust domain, the proposed scheme according to embodiments of the present invention requires only one KMS with only one public key, the same for all the communicating parties involved in the circle of trust, and a number of private keys pre-distributed to these parties. At one extreme, a trust domain may include all PLMNs and Service Providers within the IPX Ecosystem and, at the other extreme, a trust domain may include a single PLMN or a cluster of PLMNs and Service Providers within the IPX Ecosystem with an agreement to manipulate signaling messages or to access sensitive data. In the former case, all entities in the IPX Ecosystem use a single public key, whereas in the latter case, a participating party may use several public keys (for encryption and/or signature verification) and several private keys (for decryption and/or signing) corresponding to different public keys.

In the setup phase, the KMS can generate the global public key (for the respective trust domain) together with all necessary public parameters and a secret master key, and then the KMS can generate a multiplicity of private keys corresponding to the global public key, unlike a classical public-key cryptosystem where there is a single private key corresponding to each public key. The private keys can be distributed initially or in real time to the registered network entities upon verifying their attributes, e.g., the network identity attributes.

In the solution according to embodiments of the present invention, the (intermediate) network entities (intermediate between the network entity originating the signalling messages and the network entity destination of the signalling messages) can be authorized to read confidential messages and/or modify the received messages and/or insert new data (Information Elements) in the received messages to be further sent along the communication links.

The E2E confidentiality protection in hop-by-hop communication links then means that only the authorized network entities can read confidential messages. This can be achieved by identity-based encryption or Attribute-Based Encryption (ABE), discussed in greater detail in the following.

The E2E message integrity protection in hop-by-hop communication links then means that the integrity of each received message should be verifiable, that all the message changes (i.e., insertions or modifications of data—Information Elements) should be traceable to the respective network entities that made the change, and that only the authorized network entities can insert or modify data in the received messages. This can be achieved by a combination of cryptographic hashing and identity-based or Attribute-Based digital Signatures (ABS), discussed in greater detail in the following.

Identity-based or attribute-based encryption and signature are intrinsically suitable to express and implement authorizations in terms of embedded access policies characterizing the access rights and privileges. Classical public-key cryptosystems are not capable of doing that.

Each (owner-specific) private key is bound to the (unique) public key and a public specific support information identifying the network entity entitled to use that private key. The support information is embedded or built in the private key. The private (signing) key is used by its owner (i.e., the network entity authorized to use it) to sign any signaling message for which it is authorized to perform insertion or modification and to send the signaling message along the communication link towards a destination network entity, in order to prove the integrity of the message (e.g., a request) and authenticate itself. Private (decryption) keys also enable decryption of any sensitive data encrypted with the unique public (encryption) key and the specific public support information identifying the network entity authorized to decrypt it. Public support information is therefore used to dynamically differentiate the networks entities (e.g., networks within different administrative domains or different Service Providers according to the terminology used in this document) each time authorized to perform decryption of confidential messages or signing the modified or inserted messages. Also, ABS together with a standard anti-replay mechanism based on nonces (e.g., timestamps), naturally authenticates the signing entity in terms of the attributes embedded in the private (signing) key, so that public-key certificates are not needed.

Network entity identity is merely one possible network entity attribute that can be used in ABE and ABS. More generally, instead of the network entity identity attributes (and identity-based encryption and signatures), the solution according to the present invention also enables the usage of any network entity attributes, any access policy over the attributes, and the corresponding attribute-based encryption and signature. The solutions based on classical public-key encryption and signature are not capable of doing that. For signature, the access policy is embedded in the signature and the network entity attributes are embedded in the private signing key provided to that network entity. For encryption, the access policy can be embedded either in the ciphertext or in the private decryption key. In the former case, the attributes are embedded in the private decryption key, and in the latter case, the attributes are embedded in the ciphertext. In particular, the same public and private keys can be used for both ABE and ABS (e.g., ABES, disclosed for example in Cheng Chen, Jie Chen, Hoon Wei Lim, Zhenfeng Zhang, Dengguo Feng, "Combined Public-Key Schemes: The Case of ABE and ABS", Part of the Lecture Notes in Computer Science (LNCS) book series, vol. 7496, 2012, pp 53-69).

In general, a valid signature authenticates the signing entity by the access policy embedded in the signature. Namely, the attributes of the signing entity must then satisfy this access policy. In particular, in the case of identity-based signature, the access policies can involve the domain or node names or identities of the nodes that changed the signaling messages as well as the expiry times/dates of the node private signing keys. If, e.g., the access policy embedded in a signature involves a single unique node name, then the corresponding message changes are fully traceable to that node. More generally, if the access policy embedded in a signature involves a disjunction of unique node names, then the corresponding message changes are traceable to one of these nodes, without knowing which one. If more general network attributes are used (e.g., for authorization), then the network entities are characterized/authenticated only in terms of these attributes and the corresponding access policies, instead of being authenticated in terms of the identity attributes. The solution according to embodiments of the present invention is then resistant to tracking and is hence privacy-friendly.

Revocation of compromised private (signing and/or decryption) keys can be facilitated by including the expiry time of the private key, possibly on a daily basis as expiry date, in the attributes and access policies. The usage of expired private keys can then be prevented by verifying that the encryption time in ABE or the signature verification time in ABS is consistent with the expiry time from the attributes or from the access policy. This requires a periodic update of private signing and decryption keys by the KMS.

The solution according to the present invention will be in the following described making reference to some exemplary practical objectives and scenarios. In particular, the following objectives and scenarios will be discussed:

Objective A: E2E message integrity protection in hop-by-hop communication links;

Objective B: E2E message confidentiality protection in hop-by-hop communication links;

Objective C: E2E combined message integrity & confidentiality protection in general hop-by-hop communication links.

In Objective A it is assumed that there is a hop-by-hop communication link between two PLMNs, like the first PLMN PLMN-A and the second PLMN PLMN-B in FIG. 3, with intermediate nodes IPX-A and IPX-B of an IPX Eco-system in between. More generally, the communication link can include any number of intermediate nodes between the source and destination nodes. The objective is to transmit signaling messages containing data in the form of a sequence of Information Elements (e.g., AVPs in the Diameter protocol), between (a source node in the source) first PLMN PLMN-A and the (destination node in the destination) second PLMN PLMN-B in a hop-by-hop manner, with the intermediate nodes IPX-A and IPX-B which are all allowed/authorized to modify the received Information Elements before forwarding them along the communication link, as well as to insert new Information Elements (e.g., AVPs in the Diameter protocol) into the signaling messages. For E2E message integrity protection in this scenario:

1—Information Elements (e.g., AVPs in the Diameter protocol) of a signaling message which are generated (inserted or modified) by a certain node should be integrity protected by the node generating them (i.e., the node that inserted the Information Elements in the signaling message or that modified them), and 2—each receiving node along the communication link, for any received Information Element (e.g., AVP in the Diameter protocol) in a received signaling message, should be able to determine if such received Information Element has been inserted or modified, as well as to characterize all the previous nodes that either inserted or modified that Information Element. The latter property is called "traceability of message changes". It is assumed that the source node generates original signaling messages as inserted. Anti-replay protection can be ensured by including a nonce (i.e., fresh information such as a counter number or a timestamp) as a part of the sequence of Information Elements (e.g., AVPs in the Diameter protocol) comprised in the signaling message.

In Objective B the same hop-by-hop communication link as in Objective A is considered, but it is assumed that each node along the communication link inserting a new Information Element (e.g., a new AVP) in a signaling message can specify if this new Information Element is confidential or not and, if yes, which further node(s) along the communication link is(are) allowed/authorized to read it. It is assumed that the end (destination) node is always allowed/authorized to read every Information Element (e.g., AVP) of a signaling message. For E2E message confidentiality protection in this scenario, each confidential Information Element (e.g., AVP in the Diameter protocol) should be confidentiality protected in such a way that only the allowed/authorized nodes can read it.

In Objective C, the two scenarios described above (Objective A and Objective B) can be combined in a more general scenario by assuming that each node inserting a new Information Element (e.g., a new AVP in the Diameter protocol) in a signaling message can specify which further nodes along the communication link are allowed/authorized to modify it, as well as specify if the Information Element is confidential or not, and, if yes, which further nodes along the communication link are allowed/authorized to read it. The number of nodes along the communication link can be arbitrary. It is assumed that the source node generates all the signaling messages as inserted, that the destination node is always allowed to read every Information Element (e.g., every AVP in the Diameter protocol) of the signaling messages destined to it, and that the intermediate nodes can be allowed to insert new Information Elements (e.g., new AVPs in the Diameter protocol) in the signalling messages passing through them. For E2E combined message integrity & confidentiality protection in this scenario:

1—confidential Information Elements (e.g., AVPs in the Diameter protocol) should be confidentiality protected in such a way that only the allowed/authorized nodes can read them;

2—Information Elements (e.g., AVPs in the Diameter protocol) of a signaling message which are generated (inserted or modified) by a certain node should be integrity protected by the node generating (i.e., inserting or modifying) them, either in their confidentiality protected form or in their plain form, depending on whether the Information Elements are confidential or not, respectively, and 3—each receiving node along the communication link, for any Information Element in a received signaling message (e.g., AVP in the Diameter protocol), should be able to determine if the Information Element has been inserted or modified, as well as to characterize all the previous nodes that either inserted or modified that Information Element and to verify if the nodes that modified the Information Element were allowed/authorized to do so. The third property can be called "traceability of message changes". Anti-replay protection can be ensured by including a nonce (i.e., fresh information such as a counter number or a timestamp) as a part of the sequence of Information Elements (e.g., AVPs in the Diameter protocol) comprised in the signaling message.

Prior to describing in detail the solution according to the present invention as applied to the objective and scenarios set out above, some preliminary definitions and explanations will be provided, which are useful for a better understanding of the following description.

Node Attributes

Each node in the network has a set of attributes, where an attribute is any verifiable physical or logical property, which can be described as a string of characters or bits and can be expressed in some natural language. A binary attribute is a property that is satisfied or not and, as such, can be expressed as a binary (Boolean) variable. A multi-valued attribute can be expressed in terms of a set of binary attributes corresponding to individual attribute values. A node attribute can correspond to the role or functionality of the node in the network. Typically, general attributes are considered in various combinations. In order to be used electronically, attributes need to be specified and certified by attribute certificates, issued by certification authorities upon verification of the corresponding properties.

Identity is an attribute (i.e., a property) that specifies a node as a unique entity in the cyberspace (for example, the identity of a node can be a host name, a Uniform Resource Locator (URL)/Uniform Resource Identifier (URI), an IP address or any other unique name).

Domain is an attribute that specifies an equivalence class of nodes (e.g., a common administrative domain like a Realm).

Attribute-based access control relates to access to assets or resources including various data and various network functions and elements. A binary access ("yes" or "no") can be expressed as a predicate over binary attributes, i.e., as a Boolean function of the corresponding binary variables as attribute binary values. This function is called the access policy or access structure. For example, the access is allowed if this function is equal to a Boolean "1" and is denied if it is equal to a Boolean "0" (indeed, the opposite convention can be adopted as well). Typically, such a function is monotonic in that if it has value "1" for a subset of satisfied attributes, then it also has value "1" for any respective superset of satisfied attributes. Monotonic access structures can be expressed in terms of binary conjunctions and disjunctions and threshold gates (the output of a threshold gate is equal to "1" if the number of satisfied attributes at its input is greater than or equal to a specified threshold).

More generally, the access (to assets or resources including various data and various network functions and elements) can be expressed in terms of various access rights or privileges which are here called authorizations or authorization levels. Authorization levels are also node attributes, which themselves may be functions of other node attributes.

Consequently, a set of node attributes may include node identity, domain name, authorization levels, as well as other attributes possibly corresponding to various network functions and various types of data to be processed. In addition, the node attributes can also include the expiry times of the node private keys for decryption and/or signing, as discussed in detail in the following. The private key expiry time, embedded in the private key, is treated as a binary attribute that needs to be true for the access policy to be satisfied. Alternatively, it can be a part of a node identity attribute.

Attribute-Based Encryption (ABE)

Data confidentiality can be achieved by encryption, ensuring that only the entities (network nodes) having the right decryption key can read the data. The entities that are authorized to have a read-access to data are thus defined as those which are in possession of the decryption key.

For a fine-grained access policy for Information Elements (e.g., AVPs) contained in the signaling messages, Attribute-Based Encryption (ABE) can be advantageously used. The Information Elements of the signalling message are encrypted by standard symmetric-key encryption, but the symmetric keys (used for both encryption and decryption of data) are transmitted to entities (network nodes) by using ABE so that only the entities satisfying the underlying access policies for given data segments can obtain the symmetric encryption/decryption key by ABE decryption, and then they can obtain the original data segments (Information Elements) by symmetric-key decryption. This is achieved by building the access policy and entity and/or data attributes in the ABE encryption and decryption functions.

Advantageously, there is a single public encryption key PKe (where the pedix "e" is intended to mean "encryption") that is used for ABE encryption, whereas each entity in the system (i.e., each network node in the communication network) has its own private decryption key SKd (where the pedix "d" is intended to mean "decryption") used for ABE decryption.

There are two main types of ABE schemes depending on how the access policy and attributes are built in ABE encryption function (i.e., ciphertext) and private decryption keys SKd.

In Ciphertext-Policy ABE (CP-ABE), described for example in J Bethencourt, Amit Sahai, and Brent Waters, "Ciphertext-Policy Attribute-Based Encryption," 2007, pp. 321-334, a (flexible) access policy is built in ciphertext and (fixed) attribute sets are embedded in (pre-issued) private decryption keys SKd.

In Key-Policy ABE (KP-ABE), described for example in Vipul Goyal, Omkant Pandey, Amit Sahai, and Brent Waters, "Attribute-based encryption for fine-grained access control of encrypted data," New York, 2006, pp. 89-98, a (flexible) attribute set is built in ciphertext and (fixed) access policies are embedded in (pre-issued) private decryption keys SKd. Here, an attribute set is a set of satisfied (entity and/or data) attributes.

In CP-ABE, the encrypting entity chooses the access policy to embed in the ciphertext, whereas the decrypting entity uses its private decryption key SKd with the embedded attribute set specific to this decrypting entity. A description of the access policy (together with the corresponding attributes) is a part of the ciphertext, whereas a description of the attribute set is a part of the private decryption key SKd. The decryption by the private decryption key SKd works if and only if the access policy embedded in the ciphertext is satisfied by the attribute set embedded in the private decryption key SKd. The attribute set typically contains the entity attributes, while the chosen access policy may reflect the data attributes, i.e., the attributes of the data to be encrypted. However, the data attributes may also be contained in the attribute set.

In other words, let $C=Enc(P, A; PKe)$ denote the (randomized) encryption of a plaintext P under access policy A and a public encryption key PKe. Let $P=Dec(C; SKd; PKe)$ denote the decryption of a ciphertext C under a private decryption key SKd, given a public encryption key PKe, where an access policy A is a part of the ciphertext C and an attribute set $\alpha$ is embedded in the private decryption key SKd and is a part of the private decryption key SKd. The decryption works if and only if the attribute set $\alpha$ is authentic and the attribute set $\alpha$ satisfies the access policy A.

Instead, in KP-ABE, the encrypting entity chooses the attribute set to embed in the ciphertext, whereas the decrypting entity uses its private decryption key SKd with the embedded access policy specific to this decrypting entity. A description of the attribute set is a part of the ciphertext, whereas a description of the access policy is a part of the private decryption key SKd. The decryption by the private decryption key SKd works if and only if the attribute set embedded in the ciphertext satisfies the access policy embedded in the private decryption key SKd. The access policy typically involves the data attributes, while the chosen attribute set is taken from the data to be encrypted. However, the entity attributes may also be involved in the access policy and the chosen attribute set.

In other words, let $C=Enc(P, \alpha; PK)$ denote the (randomized) encryption of a plaintext P under attribute set $\alpha$ and a public encryption key PKe. Let $P=Dec(C; SKd; PKe)$ denote the decryption of a ciphertext C under a private decryption key SKd, given a public encryption key PKe, where an attribute set $\alpha$ is a part of the ciphertext C and an access policy A is embedded in the private decryption key SKd and is a part of the private decryption key SKd. The decryption works if and only if the attribute set $\alpha$ is authentic and the attribute set $\alpha$ satisfies the access policy A.

In ABE, there is a trusted Key-Management Server (KMS) that in the setup phase generates the public encryption key PKe and the secret master key MK. By using the public encryption key PKe and the secret master key MK, the KMS generates randomized private decryption keys SKd of entities/users (network nodes), initially or in real time, and distributes them over protected channels, e.g., by using a dedicated Pre-Shared Key (PSK) infrastructure or Public-Key Infrastructure (PKI). Before issuing and transmitting the private decryption keys SKd, the KMS should verify the validity of the attribute set embedded in the private decryption keys SKd for CP-ABE or the access policy embedded in the private decryption keys SKd for KP-ABE. To this end, the KMS can perform the verification by itself or utilize the attribute certificates issued by appropriate certification authorities. Such certificates are thus used only for issuing purposes.

However, and advantageously, there is no need for a classical PKI issuing public-key certificates binding entity identities to public keys for authentication purposes, since the entity attributes (possibly including identities) are automatically embedded in the private decryption keys.

In practice, ABE schemes can be based on special mathematical structures called bilinear maps, which need to be efficiently computable, for practical applications. In particular, bilinear maps can be based on elliptic curve groups. Such bilinear maps are called elliptic curve pairings. The bitsize of the public encryption key PKe can be linear in the total number of attributes, but this may not be practical. It is therefore preferable that the bitsize of the public encryption key PKe be fixed or linear in the maximum number of attributes effectively used in encryption. Such schemes are called large universe ABE schemes or constructions.

The bitsize of ciphertext is linear in the number of attributes effectively used in encryption. The bitsize of the private decryption keys SKd is linear in the number of attributes embedded in the private decryption keys SKd (either directly, as in CP-ABE, or indirectly, in terms of the access policy, as in KP-ABE). Practical implementations with the encryption time of less than 1 ms per attribute are currently feasible.

Encryption is preferably randomized, so that repeated encrypted messages cannot be distinguished from each other. This implies the property of unlinkability, which is important for privacy protection. As pointed out above, ABE is essentially used for establishing a shared secret key, which itself is then used for symmetric-key encryption of data. In practice, for encrypting a number of messages (with the same embedded access policy in CP-ABE or the same embedded attribute set in KP-ABE), the randomization parameter used in encryption can be repeated, for simplicity. Namely, this way the ciphertext overhead due to ABE is thus minimized. However, this results in the same shared secret key. Preferably, different symmetric keys for the symmetric-key encryption of the messages can then be obtained by applying a public key derivation function to the (same) shared secret key and unrepeated public parameters (nonces). These keys are unlinkable if the shared key is unknown.

The private decryption keys SKd are also randomized when generated by the KMS. This way, fresh and unlinkable keys are obtained even if the embedded attribute set in CP-ABE or embedded access policy in KP-ABE are repeated. This randomization contributes to achieving the property of collusion resistance, which states that given any number of valid private decryption keys SKd, it is infeasible to decrypt any ciphertext for any essentially new attribute set (in CP-ABE) or access policy (in KP-ABE). In other words, combining different private decryption keys SKd cannot yield any advantage enabling illegitimate decryption. Here, the property of "being essentially new" is defined as "not being implied by monotonicity."

In order to address the risk of compromised private decryption keys SKd, the embedded attribute set in CP-ABE or the embedded access policy in KP-ABE can include the expiry time of the private decryption key SKd, possibly on a daily basis as expiry date. This attribute needs to be true for the access policy to be satisfied. Accordingly, in the encryption process, this attribute can be used in the attribute set for KP-ABE or in the access policy for CP-ABE, in order to prevent the usage of expired decryption keys by rendering them obsolete.

For this, the encryption entity should know the exact expiry time embedded in the private decryption key of the intended decryption entity. For example, the encryption entity can request to the decryption entity to send the private decryption key expiry time before the encryption takes place. The encrypted message is then sent only if this time is consistent with the encryption time. It should be kept in mind that the decryption entity cannot cheat as it needs to use the expiry time embedded in its private decryption key in the decryption process. In particular, the expiry time can be a part of an identity attribute.

This technique requires a periodic update of decryption keys by the KMS. In addition, when a private decryption key SKd is compromised, the KMS can immediately issue a fresh one (with an updated expiry time) and put an identifier of the old one on a publicly available revocation list. This way a compromised key will not be used for encryption even before its expiry time.

Attribute-Based Signature (ABS)

Data integrity with non-repudiation can be achieved by classical digital signatures, ensuring that only the entities knowing the private signing key corresponding to the public verification key can generate a valid signature for a given message. This ensures that the received or retrieved message is the same as the one digitally signed by a signing entity or, in other words, that the message is authentic. An identity of the signing entity can be bound to the public verification key by a public-key certificate. However, apart from the identity, it is also possible to use other, not necessarily unique attributes or even access structures/policies over the attributes. The main objective for the verifying entity is then to verify if the message has been signed by an entity having certain attributes or, more generally, satisfying certain access policy, without revealing any more information.

In embodiments of the solution according to the present invention, classical digital signatures together with attribute public-key certificates can be used for this purpose.

However, classical digital signatures with attribute public-key certificates are linkable by the same public key which depends on the signing entity. Accordingly, classical digital signatures are not sufficiently good for privacy. Neither are they flexible in terms of access policies. Also, the public verification of a classical digital signature requires the online usage of the public key specific for the signing entity together with the corresponding public-key certificate issued by a trusted PKI.

In preferred embodiments of the solution according to the present invention, Attribute-Based Signature (ABS) is used. ABS schemes ensure that a valid signature can only be generated by an entity with attributes satisfying a given access policy and that the signatures are unlinkable. The unlinkability can be ensured by randomized signatures. The access policy is (flexibly) chosen by a signing entity and built in the signature and the (fixed) attribute sets are built in the (pre-issued) randomized private signing keys SKs (where the pedix "s" is intended to mean "signing") of the signing entities. A description of the access policy is a part of the signature. The public verification of any signature is performed by using a single trusted public verification key PKv (where the pedix "v" is intended to mean "verification") together with the corresponding access policy embedded in the signature. Advantageously, there is no need for a classical PKI issuing public-key certificates binding entity identities to public keys since the entity attributes (possibly including identities) are automatically embedded in the private signing keys SKs.

Consequently, in an ABS scheme, an entity with a private signing key SKs can generate a valid signature with an access policy embedded in the signature if and only if the attribute set embedded in the private signing key SKs satisfies this access policy. ABS is hence naturally related to CP-ABE. The role of the KMS for generating and distributing the signing keys (trusted public verification key PKv, secret master key MK, and private signing keys SKs) is analogous to that in CP-ABE. It is hence important that the KMS verifies the attribute set embedded in the private signing keys SKs before issuing the private signing keys SKs. As mentioned in the foregoing, ABS schemes exist (denoted as ABES or CP-ABES) that can use the same keys as CP-ABE (i.e., PKe=PKv and SKd=SKs). ABES is preferable with respect to key management, i.e., the process handling the management of cryptographic keys in a cryptosystem. This process deals with the generation, exchange, storage, use, destruction and replacement of keys. It also includes cryptographic protocol design, key servers, user procedures.

The risk of compromised signing keys in ABS can be addressed in a similar way as in ABE, by expiry times as attributes and by revocation lists. Since only the access policy, and not the attributes themselves, is used in the signing and in the signature verification processes, the expiry time needs to be built in the access policy so that it needs to be true in order to satisfy the access policy. Unlike ABE, this expiry time is then automatically visible to the verifier as a part of the access policy and needs to be consistent with the signature verification time.

Let $\sigma$=Sign(M, A; SKs; PKv) denote the (randomized) digital signature of a message M under access policy A and private signing key SKs, given a public verification key PKv, where an attribute set $\sigma$ is embedded in the private signing key SKs. Let Verify($\sigma$, M; PKv) denote the digital signature verification function, having value "true" or "false", for a signature $\sigma$ on message M, given a public verification key PKv, where an access policy A is a part of the digital signature $\sigma$. The output of the verification function Verify is "true" if and only if the attribute set $\sigma$ is authentic and the attribute set $\sigma$ satisfies the access policy A. In addition, Verify($\sigma$, M'; PKv) is true if and only if M'=M, i.e., if and only if the message has not been modified.

Distributed KMS

It should be noted that since the KMS generates the private keys SKd and SKs, respectively for decryption and signing, it should be trustworthy not to violate the privacy of these keys and not to issue them to fraudulent entities. In particular, the KMS can be implemented as a tamper-resistant Hardware Security Module (HSM) storing the master key MK and generating the private keys SKd and SKs on the fly, without storing them in persistent memory.

In addition, to further reduce the trust needed, the KSM should preferably be implemented in a fully distributed way by using secret sharing and threshold cryptography over a number of independent servers, without ever storing or reconstructing any secret parameters (i.e., the master key MK and randomization parameters for private keys). The independent servers should preferably be running on different operating systems, belonging to different administrative domains, and placed at different geographic locations. This renders the independent servers more resistant to cyber attacks.

Both security and reliability/robustness can be achieved by using a (k, n)-threshold secret sharing scheme. In such a scheme, any k out of n servers can reconstruct a secret and any k−1 or less servers do not get any information about the secret from their shares combined (acting as passive adversaries). This means that up to n−k servers are allowed to fail (robustness), while up to k−1 servers are allowed to be compromised (security against collusion). If k=n, then no server is allowed to fail (minimum robustness), but even as many as n−1 compromised servers cannot succeed in collusion (maximum security). The distributed protocol can be adapted to deal with active adversaries too.

Threshold cryptography can be enabled by the functions defining private keys SKd and SKs that are homomorphic in secret parameters with respect to an appropriate group operation (e.g., the addition mod p, where p is the order of the underlying elliptic curve group). Therefore, these secret parameters (master key MK and randomization parameters for private keys SKd and SKs) can be generated and stored in terms of shares only and the private keys SKd and SKs can thus be computed securely in a distributed way by each server computing a partial function on its shares, without ever generating or reconstructing the secret parameters. The partial computation results of the servers are sent directly to the destination entity (e.g., a network node), where they are combined together into a private key SKd or SKs.

Multiple KMSs

The needed trust in KMS can be further reduced by using multiple Key Management Servers (KMSs), that is, a number of independent KMSs with different public keys PKe, PKv and master keys MK. Each KMS can serve a single PLMN or a cluster of PLMNs and Service Providers within the IPX Ecosystem with an agreement to manipulate signaling messages or to access sensitive data. In the former case, all entities in the IPX Ecosystem use a single public key PKe, PKv, whereas in the latter case, a participating party may use several public encryption keys PKe for encryption and possibly also several issued private keys SKd and SKs (corresponding to several public keys) for decryption and signatures. Each KMS can be identified with a publicly known index, which is associated with the KMS public key and with each corresponding private key issued. For each node, the node attributes can then include the indexes of the private keys issued to that node, which enable the encrypting or signature verifying party to recognize which public keys PKe or PKv can be used for that node.

Example of Access Policy

For some practical applications, the access policy to be embedded in the ciphertext (for ABE) or in the signature (for ABS) can be defined as a disjunction of a number of chosen attributes. A private decryption or signing key SKd or SKs will then work if and only if the attribute set embedded in the private decryption or signing key SKd or SKs contains at least one attribute from the access policy.

On the other hand, if the embedded access policy is defined as a conjunction of attributes, then the private decryption or signing key SKd or SKs will work if and only if the attribute set embedded in the private decryption or signing key SKd or SKs contains all the attributes from the access policy. It should be noted that a fixed conjunction of a number of attributes can be expressed as a single attribute. In both cases, the ciphertext or signature size is linear in the number of attributes from the access policy.

In particular, the attributes may involve various node identities and domain names for network nodes. In this case, ABE can be considered as Identity-Based Encryption (IBE) and ABS as Identity-Based Signature (IBS), where the identity is taken in a broader sense, not necessarily being unique. In the case of disjunction of selected identity attributes as an access policy, decryption or signing will work if and only if a node possesses at least one of the selected identity attributes.

§ § §

In the following, application of the solution according to the present invention to the objectives and scenarios set out in the foregoing will be described in detail.

Solution Applied to Objective A

E2E Message Integrity Protection in Hop-by-Hop Communication Links

Making reference to FIG. 3, let it be assumed that there is a hop-by-hop communication link between the first PLMN PLMN-A and the second PLMN PLMN-B, with intermediate IPX nodes IPX-A and IPX-B (of the IPX Ecosystem) in between. More generally, the number of intermediate nodes can be arbitrary. In the example here considered, the desired signaling message integrity with traceability of message changes is proposed to be achieved by using cryptographic hash functions and Attribute-Based Signatures (ABS).

The source node, assumed to be within the first PLMN PLMN-A, generates a signaling message containing several (a sequence of) Information Elements (e.g., AVP messages in Diameter protocol) and sends the signaling message (i.e., the sequence of Information Elements as a whole) to the destination node, which is assumed to be within the second PLMN PLMN-B. The source node can for example be the HSS, or the MME, or the SGSN or the PCRF of the first PLMN PLMN-A; the destination node can for example be the HSS, or the MME, or the SGSN or the PCRF of the second PLMN PLMN-B.

In this scenario, any intermediate node in the communication link, e.g., within the IPX nodes IPX-A and IPX-B (e.g., an IPX service provider or an IPX Service Hub) is assumed to be authorized to modify the received Information Elements of a received signaling message, as well as to delete Information Elements or to insert new Information Elements. Deletion of Information Elements is treated as modification of Information Elements in the sequence.

To ensure the integrity and traceability of changes on a per Information Element basis, each node needs to appropriately sign the inserted or modified Information Elements. The originally sent Information Elements are regarded as inserted by the source node. The node generating a signaling message containing a sequence of Information Elements can be authenticated by embedding its attributes in the signature and by including a nonce for anti-replay protection in the Information Element sequence.

To keep track of the Information Elements in the signaling message, the Information Elements are indexed by assigning a unique index to each Information Element and the Information Element index is a part of each Information Element. As such, the indexes of the Information Elements can be generated by a counter by assigning new indexes to the inserted Information Elements in order of their appearance and without changing the indexes already assigned earlier in the process.

Signing

At a generic node along the communication link (also referred to as the current node, in the sequence), the inserted or modified Information Elements (which have been inserted or modified by the current node) are first hashed individually and then the sequence of their hashes, together with indexes of inserted or modified Information Elements (in a given order, e.g., in order of increasing indexes) and the flags indicating whether an Information Element has been inserted or modified, is hashed itself and digitally signed. Such indexes and the flags are a part of the digital signature (for convenience, a distinct flag for deletion of an Information Element can be introduced, but this is not necessary since deletion is a special case of modification of an Information Element). Hashing is done using a cryptographic hash function, such as, for example, SHA-256 (Secure Hash Algorithm).

In addition, for enabling the verification of the authenticity of changes made to a signaling message, each current node for each modified Information Element (modified by the current node) computes the hash value of the original, received Information Element and appends the hash to the modified Information Element sent to the next node along the communication link. The computed hash value of the modified Information Element used in the digital signature of the current node does not need to encompass the appended hash value of the original Information Element, which has already been used in the digital signature of the previous node that generated (i.e., inserted or modified) that received Information Element. A deleted Information Element thus remains in the sequence of Information Elements but contains only the index and the hashed value of the original Information Element.

The digital signature is thus computed only for changed (inserted or modified—as mentioned above, deletion is regarded as a modification) Information Elements in the sequence and then attached to the sequence of Information Elements as a whole as a new dedicated Information Element in the signaling message. It should be noted that computing only one signature per whole sequence is advantageous for complexity reasons.

If no Information Element changes have been performed by a current node, then no signature is computed by that current node. The digital signature of the source node relates to all the Information Elements of the signaling message as originally sent, as they are all inserted by the source node.

Classical digital signatures with PKI can be used for computing the digital signatures. However, using ABS instead of classical digital signatures with PKI is advantageous because only one public verification key PKv is used for verifying the signatures and multiple entities can digitally sign the Information Elements under flexible access policies and without revealing any more information than the fact that their attributes satisfy the chosen access policies.

In practice, a set of node attributes may include domain name (e.g., the Realm), node name (host name), other attributes possibly corresponding to various network functions and types of data to be processed, as well as the expiry time/date of the node private signing key SKs. Each node along the communication link can choose an access policy to be embedded in its digital signature. In particular, in the case of the identity-based signature scheme, the access policy can involve the domain or node name, possibly extended by a number of attributes possibly including the expiry time/date of the node private signing key.

Verification

Each node along the communication link, including the destination node, can verify the integrity of received signaling messages and trace the changes by iteratively verifying the existing attached digital signatures, proceeding backwards from the last attached digital signature and iteratively updating the sequence of hashed Information Elements starting from the received signaling messages. Firstly, the hash values of individual Information Elements are computed directly on the received Information Element sequence and the first signature is verified.

Since each verified signature implies that the modified or inserted Information Elements in the checked sequence are authentic both in terms of content and indexes, the inserted Information Elements are removed from the sequence, whereas for each modified Information Element the computed hash value is replaced by the one appended to the Information Element, which corresponds to the Information Element before modification. This way the sequence of hashed Information Elements is updated and the process can proceed to the verification of the preceding digital signature, corresponding to the preceding Information Element sequence before the change.

At the end, the process moves to the original Information Element sequence and the first digital signature, generated by the source node. The integrity verification is successful if and only if all the digital signatures are verified as valid. It should be noted that a valid signature means that the corresponding inserted or modified Information Elements are authentic. Consequently, the successful verification means that the received Information Element sequence is authentic and that all the Information Element changes (due to Information Element insertions or modifications) are authentic. In the verification process, the destination node only learns the final, received Information Element values as well as the hash values and indexes of all modified Information Elements. The same holds for any other receiving node along the link.

Since digital signatures relate to the sequence of Information Elements as a whole in the signaling message, and not to individual Information Elements, each node should verify only the signatures attached to the received signaling message sequence of Information Elements, thus reducing the complexity of a number of times equal to the number of Information Elements in the sequence. In the case when some verified signatures result as invalid, there is a need to retransmit the respective Information Elements or the whole message sequence.

Depending on the node attributes used in ABS, the destination node also learns the access policies embedded in the verified digital signatures. In the case of identity-based signature, the access policies can involve the domain or node names or identities of the nodes that changed the messages as well as the expiry times/dates of the node private signing keys. In particular, if the access policy embedded in a digital signature involves a single unique node name, then the corresponding Information Element changes are fully traceable to that node. More generally, if the access policy embedded in a digital signature involves a disjunction of unique node names, then the corresponding Information Element changes are traceable to one of these nodes, without knowing which one. Accordingly, a valid digital signature hence authenticates the signing entity by the access policy embedded in the signature. Namely, its attributes must then satisfy this access policy.

Here below some examples applying the above described scheme to Diameter protocol are detailed.

Example 1: Mobile Management Entity (MME) Generated Signaling Message Only Protected in Terms of Authenticity and Integrity; No Changes Performed During the Transit Referring to FIG. 3, a user being a subscriber of the second PLMN PLMN-B (which is the home PLMN for the user) is registering to the first PLMN PLMN-A (which acts as the visited PLMN for the user). The user is therefore a "roamer" for the first PLMN PLMN-A.

The MME of the visited, first PLMN PLMN-A (named MMEPLMN-A in the sequence and being the source node of the signaling message SM, in this example) sends an Update Location Request (ULR, which is the signaling message SM in this and the following examples) to the Home Subscriber Server (HSS) of the home, second PLMN PLMN-B (named HSS-B in the sequence, being the destination node in this example). It is assumed that there is no agreement in place between the two involved PLMNs PLMN-A, PLMN-B and any other third party (like nodes IPX-A and IPX-B) to alter the signaling message SM in transit, consequently a signaling message SM in transit between the two PLMNs PLMN-A and PLMN-B and passing through nodes IPX-A and IPX-B cannot be changed and new Information Elements (AVPs) cannot be added.

Figure 4:
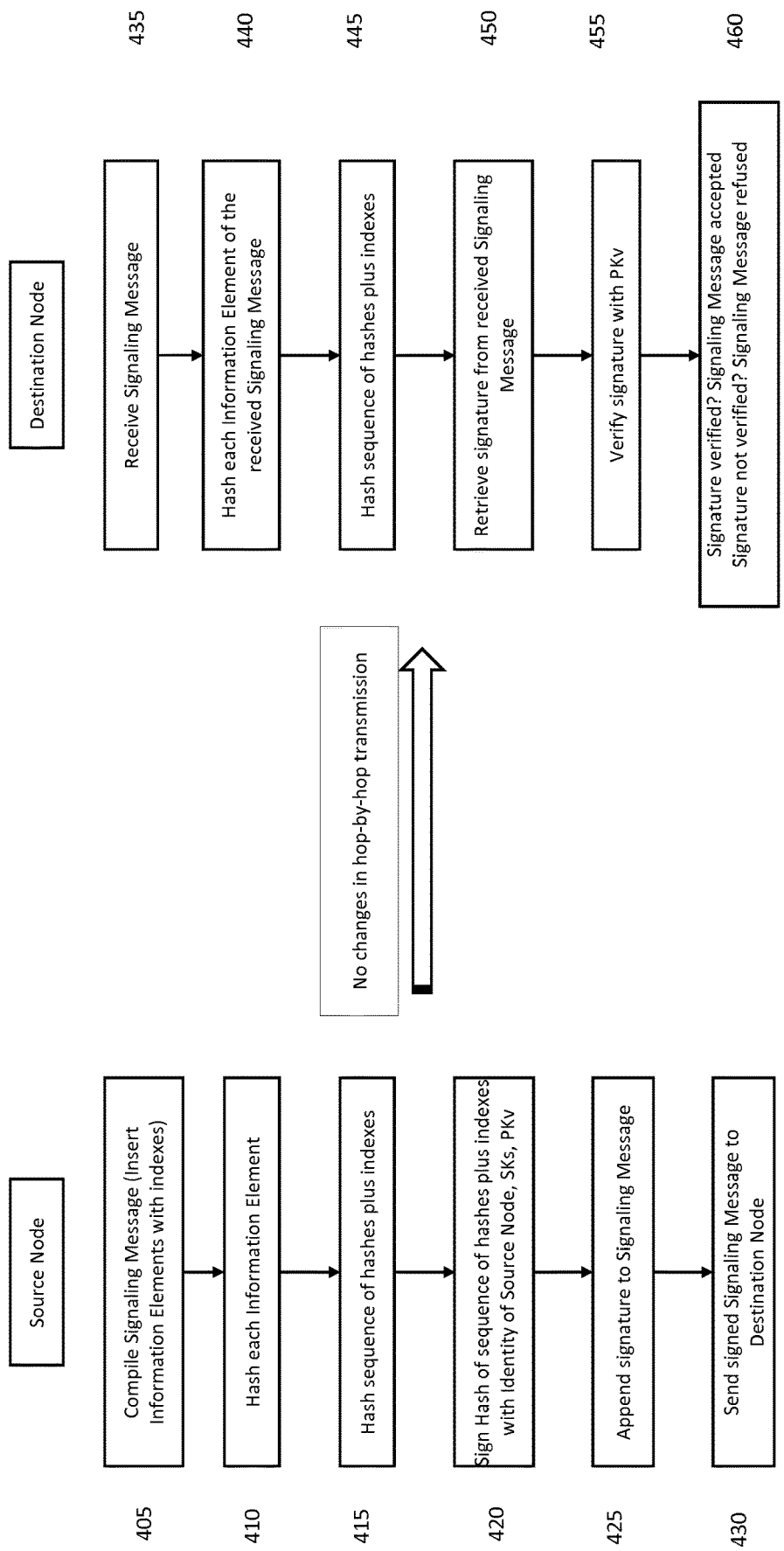
FIG. 4 depicts the main actions performed by a source node and a destination node in an example of application of the solution according to the present invention.

The main actions performed by the source node and the destination node are schematized in FIG. 4.

The MME $MME_{PLMN-A}$ builds the ULR signaling message (action 405) by including a sequence of Information Elements (AVPs).

The ULR signaling message contains for example the following Information Elements (AVPs), inserted by the MME MMEPLMN-A:

Vendor-Specific-Application-Id
Auth-Session-State
Origin-Host
Origin-Realm
Destination-Host
Destination-Realm
User-Name
Optical Carrier (OC)-Supported-Features
Supported-Features
Terminal-Information
Radio Access Technology (RAT)-Type
ULR-Flags
User Equipment-Single Radio Voice Call Continuity (UE-SRVCC)-Capability
Visited-PLMN-Id
SGSN-Number
Homogeneous-Support-of-IP Multimedia Subsystem (IMS)-Voice-Over-Public Service (PS)-Sessions
Gateway Mobile Location Center (GMLC)-Address
Active-Access Point Name (APN)
Equivalent-PLMN-List
MME-Number-for-Mobile Terminated-Short Message Service (MT-SMS)
SMS-Register-Request
Smart Grids (SGs)-MME-Identity
Coupled-Node-Diameter-ID
Proxy-Info
Route-Record The structure of the URL is known per se, being defined in the 3GPP Technical Specification TS 29.272 V. 15.2.0, and thus a description of the meaning of the various AVPs is omitted.

The first PLMN PLMN-A should prove the authenticity and the integrity of the ULR sent to the second PLMN PLMN-B, so the first PLMN PLMN-A adds to the ULR signaling message a digital signature proving that the signaling message is an authentic and fresh signaling message. This operation can be performed directly by the MME $MME_{PLMN-A}$ of the first PLMN PLMN-A, or by another signaling node deployed at the network boundaries of the first PLMN PLMN-A, like a DEA or a FireWall (FW) able to inspect and check signaling messages. The entity performing this crypto function is hereinafter named Secure Diameter Node (SDM).

Assuming that, in this example, the signature is calculated by the SDM deployed within the first PLMN PLMN-A, named SDMPLMN-A in the sequence, then the SDM $SDM_{PLMN-A}$:

firstly hashes individually each AVP of the ULR signaling message, inserted by the MME $MME_{PLMN-A}$ (action 410), then, it hashes again the sequence (concatenation) of the calculated hashes, together with indexes of inserted AVPs (action 415), and finally it digitally signs this last hash (global hash) of the concatenation of hashes and indexes, named H (action 420).

In particular, assuming that all the inserted AVPs are protected in terms of integrity and authenticity, denoting as AVPi the i-th AVP in the ULR signaling message, the SDM $SDM_{PLMN-A}$ calculates the global hash H in the following way:

$$H=\text{Hash}(\text{index}_1\|\text{Hash}(\text{AVP}_{index1})\|\text{index}_2\|\text{Hash}(\text{AVP}_{index2})\|\ldots\|\text{index}_N\|\text{Hash}(\text{AVP}_{indexN})).$$

where $\text{index}_1\|\text{Hash}(\text{AVP}_{index1})\|\text{index}_2\|\text{Hash}(\text{AVP}_{index2})\|\ldots\|\text{index}_N\|\text{Hash}(\text{AVP}_{indexN})$ is the sequence (concatenation) of the individual AVPs hashes, each one associated with the respective index of the AVP in the sequence of AVPs comprised in the ULR signaling message.

Also, a timestamp or a sequence number can preferably be used in the global hash H calculation in order to address replay attacks.

In the case of IBS the access policies involve the identity of the SDM $SDM_{PLMN-A}$ and consequently the signature $\sigma_{PLMN-A}$ is calculated in the following way:

$$\sigma_{PLMN-A}=\text{Sign}(H,\text{Identity of SDM}_{PLMN-A};SKs;PKv).$$

Finally, the calculated signature $\sigma_{PLMN-A}$ is appended to the original ULR signaling message using a dedicated Information Element which can be a dedicated grouped AVP named, for example, "Signatures" (action 425) (the Diameter protocol allows AVP values of type "Grouped": the Data field is a sequence of AVPs; in other words, a grouped AVP is similar to a single AVP, except that the data field of the grouped AVP contains one or move AVPs rather than Raw data, and the one or more AVPs form the data).

The new signed ULR signaling message contains the same AVPs listed before and the new grouped AVP "Signatures" that contains the signature $\sigma_{PLMN-A}$:

The signed ULR signaling message contains for example the following Information Elements (AVPs):

Vendor-Specific-Application-Id
Auth-Session-State
Origin-Host

Origin-Realm
Destination-Host
Destination-Realm
User-Name
OC-Supported-Features
Supported-Features
Terminal-Information
RAT-Type
ULR-Flags
UE-SRVCC-Capability
Visited-PLMN-Id
SGSN-Number
Homogeneous-Support-of-IMS-Voice-Over-PS-Sessions
GMLC-Address
Active-APN
Equivalent-PLMN-List
MME-Number-for-MT-SMS
SMS-Register-Request
SGs-MME-Identity
Coupled-Node-Diameter-ID
Proxy-Info
Route-Record
Signatures ($\sigma_{PLMN-A}$)

that is, all the AVPs inserted by the MME $MME_{PLMN-A}$ plus the grouped AVP "Signatures" appended by the SDM $SDM_{PLMN-A}$.

The signed ULR signaling message is sent to the destination node (action 430).

As mentioned above, in this example it is assumed that none of the intermediate nodes along the communication link can change the ULR signaling message. The intermediate nodes (IPX-A and IPX-B, in the example of FIG. 3) do not perform any action and simply forward the signed ULR signaling message to the second PLMN PLMN-B.

The HSS of the second PLMN PLMN-B ($HSS_{PLMN-B}$) (more generally, the SDM of the second PLMN PLMN-B, $SDM_{PLMN-B}$, which can be the HSS $HSS_{PLMN-B}$ of the second PLMN PLMN-B, or the DEA of the second PLMN PLMN-B) receives the signed ULR signaling message (action 435) and calculates a global hash H' in the same way as the SDM $SDM_{PLMN-A}$ (actions 440 and 445):

$H'$=Hash(index$_1$‖Hash(AVP$_{index1}$)‖index$_2$‖Hash (AVP$_{index2}$)‖ . . . ‖index$_N$‖Hash(AVP$_{indexN}$)), i.e., the global hash H' is calculated on all the AVPs (and respective indexes) exception made for the grouped AVP "Signatures".

Then the HSS $HSS_{PLMN-B}$ retrieves from the grouped AVP "Signatures" of the received ULR signaling message the signature $\sigma_{PLMN-A}$ (action 450) and verifies the digital signature (action 455) using the access policies embedded in the digital signature signature $\sigma_{PLMN-A}$ (as discussed in the foregoing):

Verify($\sigma_{PLMN-A}$,H';PKv).

If the verification of the signature $\sigma_{PLMN-A}$ is successful, the integrity of the received ULR signaling message is confirmed and the received ULR signaling message is accepted by the HSS $HSS_{PLMN-B}$ (destination node), otherwise the message is refused by the destination node (action 460).

Example 2: MME Generated Signaling Message Only Protected in Terms of Authenticity and Integrity; Changes (AVP Value Replacement) Performed During the Transit As in Example 1, a user who is a subscriber of the second PLMN PLMN-B (home PLMN for the user) is registering to the first PLMN PLMN-A (visited PLMN for the user).

The MME $MME_{PLMN-A}$ of the first PLMN PLMN-A sends an Update Location Request (ULR, the signal message SM in this example) to the HSS of the second PLMN PLMN-B ($HSS_{PLMN-B}$).

The ULR contains the same Information Elements (AVPs) listed in the Example 1 above. The actions of the MME $MME_{PLMN-A}$ are the same as described in Example 1.

Let it be assumed that there is an agreement in place between the second (home) PLMN PLMN-A and the IPX Ecosystem node IPX-A allowing node IPX-A to alter the ULR signaling message in transit by adding and/or replacing AVPs. For example, node IPX-A sells a Roaming brokerage service to the second PLMN PLMN-A and so node IPX-A can modify the AVP "User-Name" in the ULR signaling message.

Let it also be assumed that the value of the AVP "User-Name" originally inserted in the ULR by the $MME_{PLMN-A}$ of the first PLMN PLMN-A is "username$_{origin-value}$".

The first PLMN PLMN-A should prove the authenticity and the integrity of the ULR signaling message sent to the second PLMN PLMN-B, so the first PLMN PLMN-A has to add to the ULR signaling message a digital signature proving that the message is an authentic and fresh signaling message. This operation can be performed directly by the MME $MME_{PLMN-A}$ of the first PLMN PLMN-A, or by another signaling node deployed at the network boundaries, like the DEA of the first PLMN PLMN-A or a FW able to inspect and check signaling messages. As in Example 1, the entity performing this crypto function is named Secure Diameter Node (SDM). Assuming for example that the digital signature is calculated by the SDM $SDM_{PLMN-A}$ deployed within the first PLMN PLMN-A, then the SDM $SDM_{PLMN-A}$ firstly hashes individually each AVP of the ULR and then it hashes again the sequence of their hashes, together with indexes of inserted AVP; finally, the SDM $SDM_{PLMN-A}$ digitally signs this last global hash named H, as shown in Example 1:

$H$=Hash(index$_1$‖Hash(AVP$_{index1}$)‖index$_2$‖Hash (AVP$_{index2}$)‖ . . . ‖index$_N$‖Hash(AVP$_{indexN}$)), $\sigma_{PLMN-A}$=Sign(H,Identity of $SDM_{PLMN-A}$;SKs;PKv).

As in Example 1, the access policy A is represented by the identity of the SDM $SDM_{PLMN-A}$ and the digital signature $\sigma_{PLMN-A}$ is calculated in the same way as in Example 1 and appended to the original ULR using the dedicated grouped AVP "Signatures". Also, a timestamp or a sequence number is preferably used in the hash calculation.

Figure 5A:
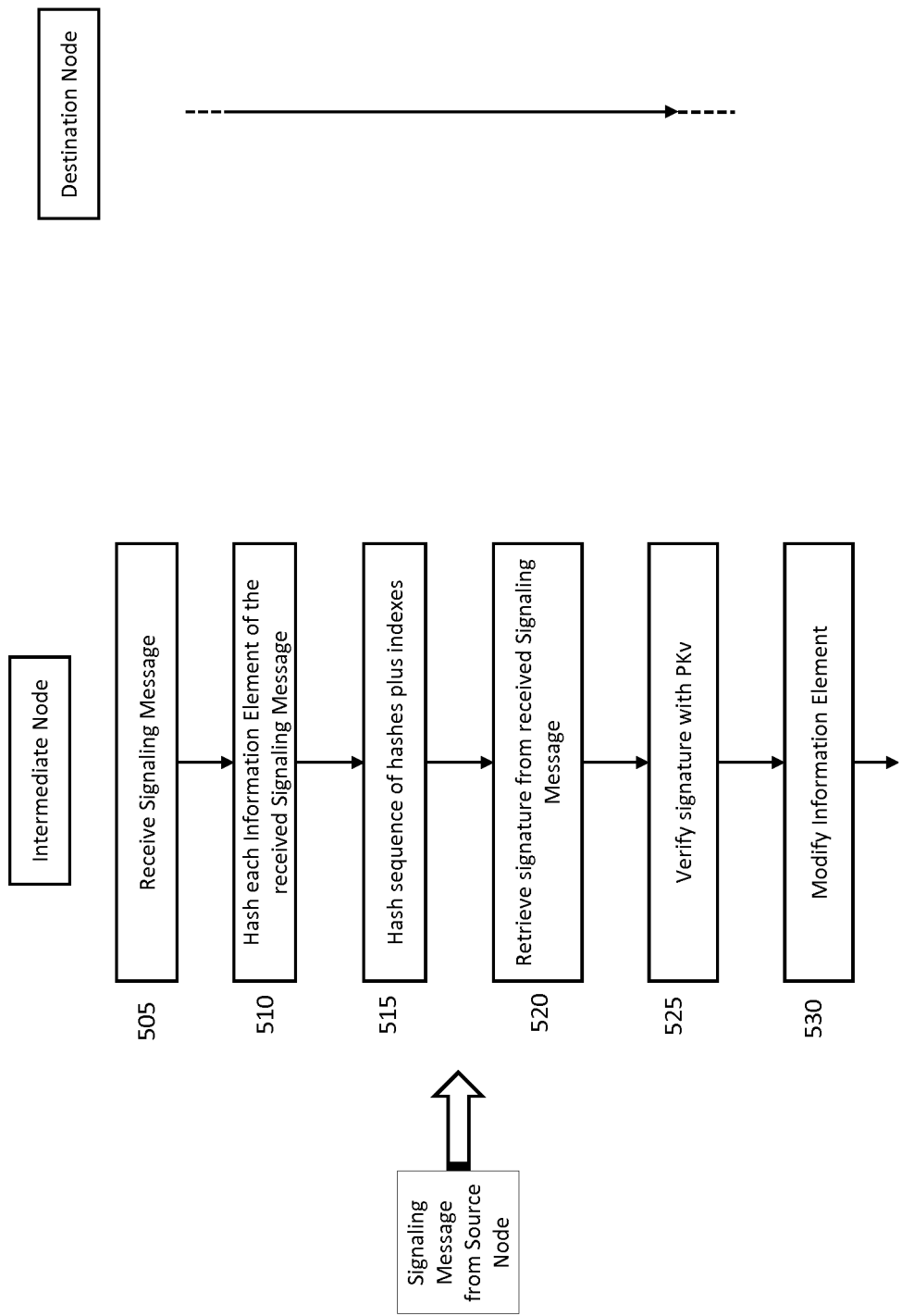
FIGS. 5A-5C depict the main actions performed by an intermediate node in a hop-by-hop communication, and by a destination node, in another example of application of the solution according to the present invention.
Figure 5B:
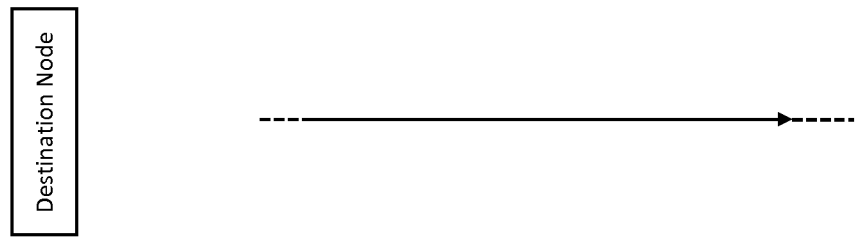
Figure 5B:
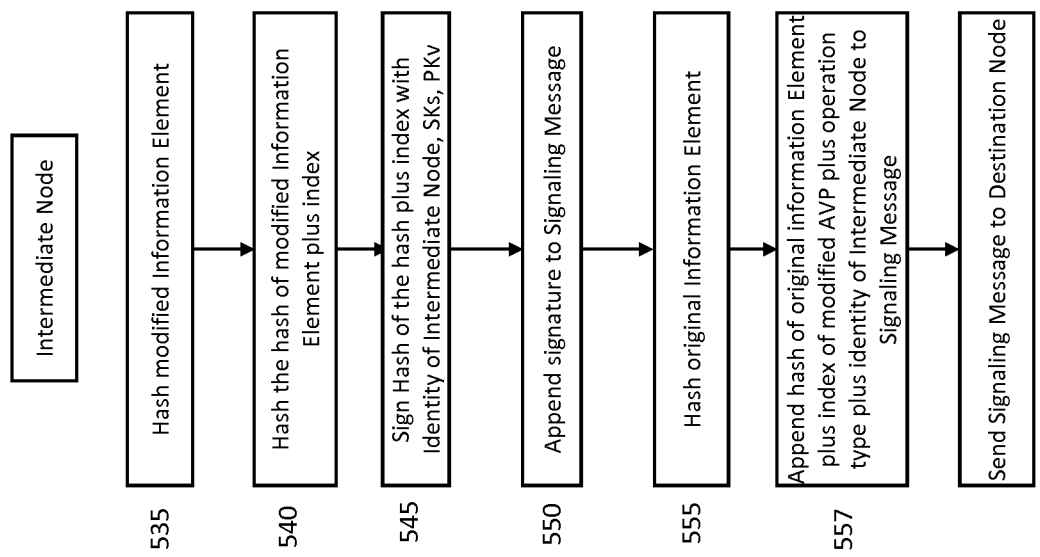
Figure 5C:
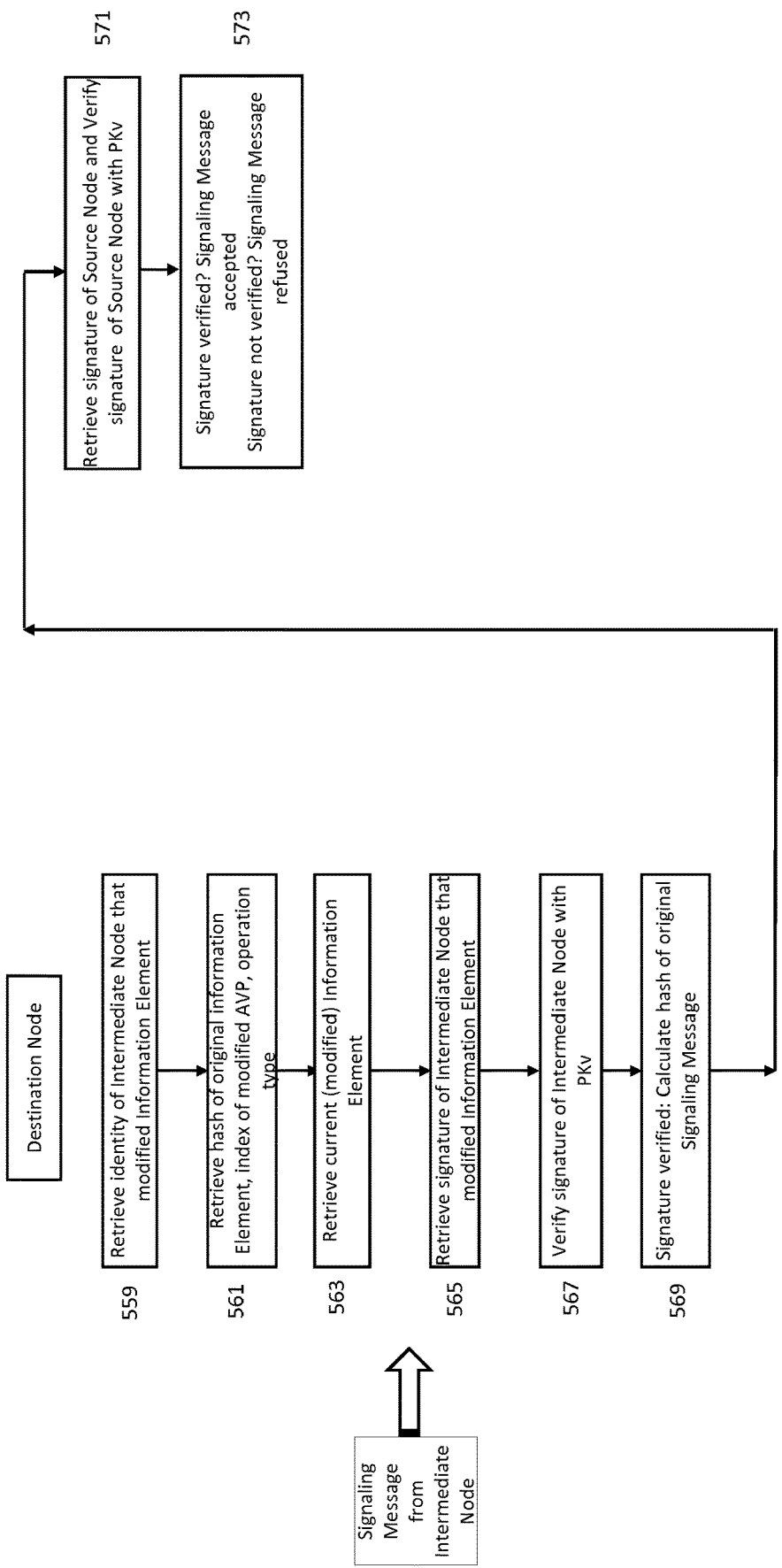

The main actions performed by the intermediate node IPX-A and the destination node are schematized in FIGS. 5A-5C.

The IPX Service Provider of node IPX-A receives the signed ULR signaling message from the first PLMN PLMN-A (action 505). Assuming that the node receiving this message and performing the crypto function is a SDM deployed within node IPX-A, named $SDM_{IPX-A}$, this latter firstly verifies the validity of the signature $\sigma_{PLMN-A}$ as described in the Example 1, by calculating a global hash H' in the same way as the SDM $SDM_{PLMN-A}$ (actions 510-515) and then retrieving the signature $\sigma_{PLMN-A}$ (action 520) from the grouped AVP "Signatures" and verifying the digital signature using the access policies embedded in the digital signature $\sigma_{PLMN-A}$ (action 525):

Verify($\sigma_{PLMN-A}$,H';PKv).

If the signature $\sigma_{PLMN-A}$ is valid, then the SDM $SDM_{IPX-A}$ replaces the value "username$_{original-value}$" within the AVP "User-Name" received from SDM $SDM_{PLMN-A}$ with the new value "username$_{modified-value}$" (action 530).

Then, the SDM $SDM_{IPX-A}$ firstly hashes this modified AVP individually (i.e., the SDM $SDM_{IPX-A}$ calculates the hash Hash(username$_{modified-value}$)) (action 535) and then it hashes this single hash together with the index of this modified AVP (action 540) as shown below:

$$H_{IPX-A} = (\text{index}_{AVP-Username} \| \text{Hash}(\text{username}_{modified-value}))$$

The calculated hash $H_{IPX-A}$ is then digitally signed (action 545):

$$\sigma_{IPX-A} = \text{Sign}(H_{IPX-A}, \text{Identity of SDM}_{IPX-A}; \text{SKs}; PKv).$$

In the computation of the digital signature $\propto_{IPX-A}$ a value (e.g., a sequence number or a timestamp) is preferably used to avoid replay-attacks.

This new digital signature $\sigma_{IPX-A}$ is appended by the SDM $SD_{IPX-A}$ in the dedicated grouped AVP "Signatures" of the ULR signaling message as a new atomic AVP of type "Signature" (action 550).

The SDM $SDM_{IPX-A}$ also calculates the hash of the original value "username$_{original-value}$" of the AVP "User-Name" that has been modified (action 555):

$$h_{original-value-username} = \text{hash}(\text{username}_{original-value}).$$

The calculated hash $h_{original-value-username}$ of the original value "username$_{original-value}$" of the AVP "User-Name" is appended to the ULR signaling message using a new dedicated grouped AVP named e.g. "ModifiedAVPs" together with the index of the AVP "User-Name" in the original message (i.e. index$_{AVP-username}$) and the type of the operation performed on the AVP (in this case, e.g., 'replacement') (action 557). This AVP is inserted into the grouped AVP "ModifiedAVPs" containing the identity of the node IPX-A that modified the ULR signaling message. In case the node IPX-A performs more than one operation on the ULR signaling message, the grouped AVP "ModifiedAVPs" includes the identity of IPX-A and one or more of AVPs of type "ModifiedAVP", each one containing the hash of the original value of the AVP on which the operation has been performed, the index of that AVP in the original ULR signaling message and the type of operation performed on that AVP).

In the example here considered, the new ULR sent out by $SDM_{IPX-A}$ is now composed by:
  Vendor-Specific-Application-Id (unchanged value)
  Auth-Session-State (unchanged value)
  Origin-Host (unchanged value)
  Origin-Realm (unchanged value)
  Destination-Host (unchanged value)
  Destination-Realm (unchanged value)
  User-Name (new value)
  OC-Supported-Features (unchanged value)
  Supported-Features (unchanged value)
  Terminal-Information (unchanged value)
  RAT-Type (unchanged value)
  ULR-Flags (unchanged value)
  UE-SRVCC-Capability (unchanged value)
  Visited-PLMN-Id (unchanged value)
  SGSN-Number (unchanged value)
  Homogeneous-Support-of-IMS-Voice-Over-PS-Sessions (unchanged value)
  GMLC-Address (unchanged value)
  Active-APN (unchanged value)
  Equivalent-PLMN-List (unchanged value)
  MME-Number-for-MT-SMS (unchanged value)
  SMS-Register-Request (unchanged value)
  SGs-MME-Identity (unchanged value)
  Coupled-Node-Diameter-ID (unchanged value)
  Poxy-Info (unchanged value)
  Route-Record (unchanged value)
  ModifiedAVPs (identity of IPX-A, $h_{original-value-username}$, index$_{AVP-Username}$, 'replacement')
  Signatures ($\sigma_{PLMN-A}$, $\sigma_{IPX-A}$)

The grouped AVP "Signatures" is composed of multiple "Signature" AVPs containing e.g. the identity of the signing node, the signature and, if needed, a timestamp. The last appended signature can be identified on a per index basis or using a timestamp or using the identity of the signing node.

The node IPX-B, upon receiving the signaling message from node IPX-A, does not perform any manipulation on the message and forwards it to the SDM $SDM_{PLMN-B}$ of the second PLMN PLMN-B. The SDM $SDM_{PLMN-B}$ receives the ULR signaling message and verifies the signatures available in the grouped AVP "Signatures", as described below:

1. The SDM $SDM_{PLMN-B}$ checks the existence in the signaling message ULR of the grouped AVP "ModifiedAVPs". If the grouped AVP "ModifiedAVPs" exists, then the SDM $SDM_{PLMN-B}$ retrieves the identity of the node IPX-A included in the grouped AVP "ModifiedAVPs" (action 559) and, for each single AVP available in this grouped AVP "ModifiedAVPs", the hash of the original AVP value (i.e., $h_{original-value-username}$), the index of this AVP in the ULR signaling message (i.e., index$_{AVP-username}$) and the type of operation (a 'replacement' operation, in this example) (action 561).

2. Since the operation type is 'replacement', by means of the modified AVP index index$_{AVP-username}$, the SDM $SDM_{PLMN-B}$ retrieves the current value of the modified AVP (i.e. "username$_{modified-value}$") and calculates the hash $h_{modified-value-username}$ thereof (action 563). Referring to this example:

$$h_{modified-value-username} = \text{hash}(\text{index}_{AVP-username} \| \text{hash}(\text{username}_{modified-value})).$$

3. The SDM $SDM_{PLMN-B}$ retrieves from the grouped AVP "Signatures" the correct signature $\sigma_{IPX-A}$ of node IPX-A (action 565) and verifies the signature (action 567):

Verify($\sigma_{IPX-A}, h_{modified-value-username}; PKv$).

4. If this verification is successful, then the SDM $SDM_{PLMN-B}$ calculates the global hash $h_{original-message}$ of the original ULR signaling message, using the hash of the original AVP value $h_{original}$-value-username (action 569):

$$h_{original-message} = \text{Hash}(\text{index}_1 \| \text{Hash}(AVP_{index1}) \\ \| \text{index}_2 \| \text{Hash}(AVP_{index2}) \| \ldots \| \\ \text{index}_{AVP-Username} \| h_{original-value-username} \| \ldots \\ \| \text{index}_N \| \text{Hash}(AVP_{indexN}))$$

and verifies the digital signature of PLMN PLMN-A that sent the original ULR signaling message:

Verify($\sigma_{PLMN-A}, h_{original-message}; PKv$)

retrieving from the grouped AVP "Signatures" the signature $\sigma_{PLMN-A}$ of PLMN-A (action 571).

Finally, if this verification is also successful, the ULR signaling message is accepted, otherwise it is refused (action 573).

Example 3: MME Generated Signaling Message Only Protected in Terms of Authenticity and Integrity; Changes (AVP Value Replacement Plus AVP Addition) Performed During the Transit This example is equal to Example 2, with the difference that node IPX-A performs two different operations on the ULR signaling message received from the first PLMN PLMN-A: a change of an existing AVP value and the addition of a new AVP.

All the steps performed by the first PLMN PLMN-A are skipped and this description is focused only on the operations and the verification phase of the node IPX-A and the second PLMN PLMN-B (destination node of the ULR signaling message).

Figure 6A:
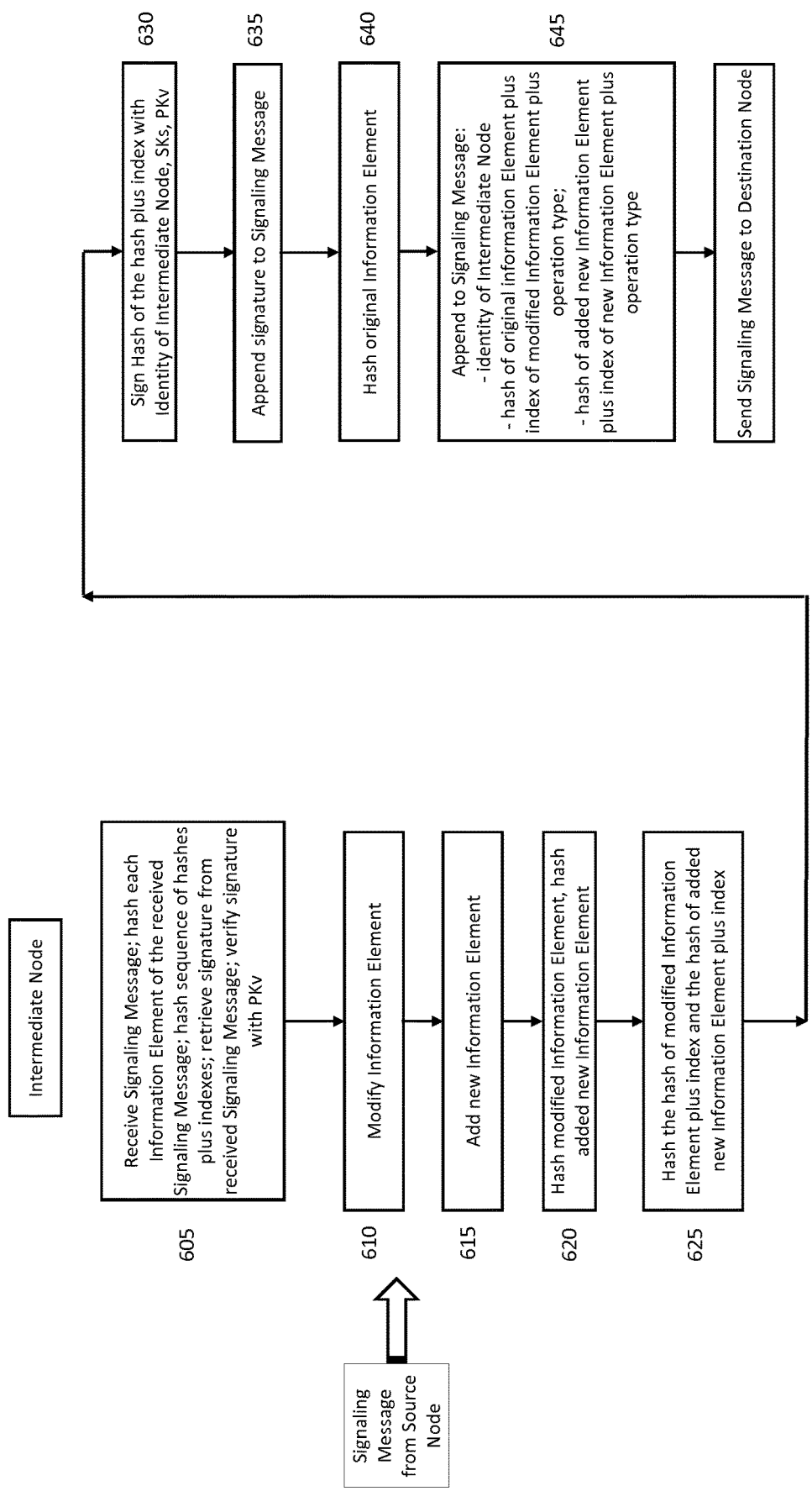
FIGS. 6A-6B depict the main actions performed by an intermediate node in a hop-by-hop communication, and by a destination node, in still another example of application of the solution according to the present invention.
Figure 6B:
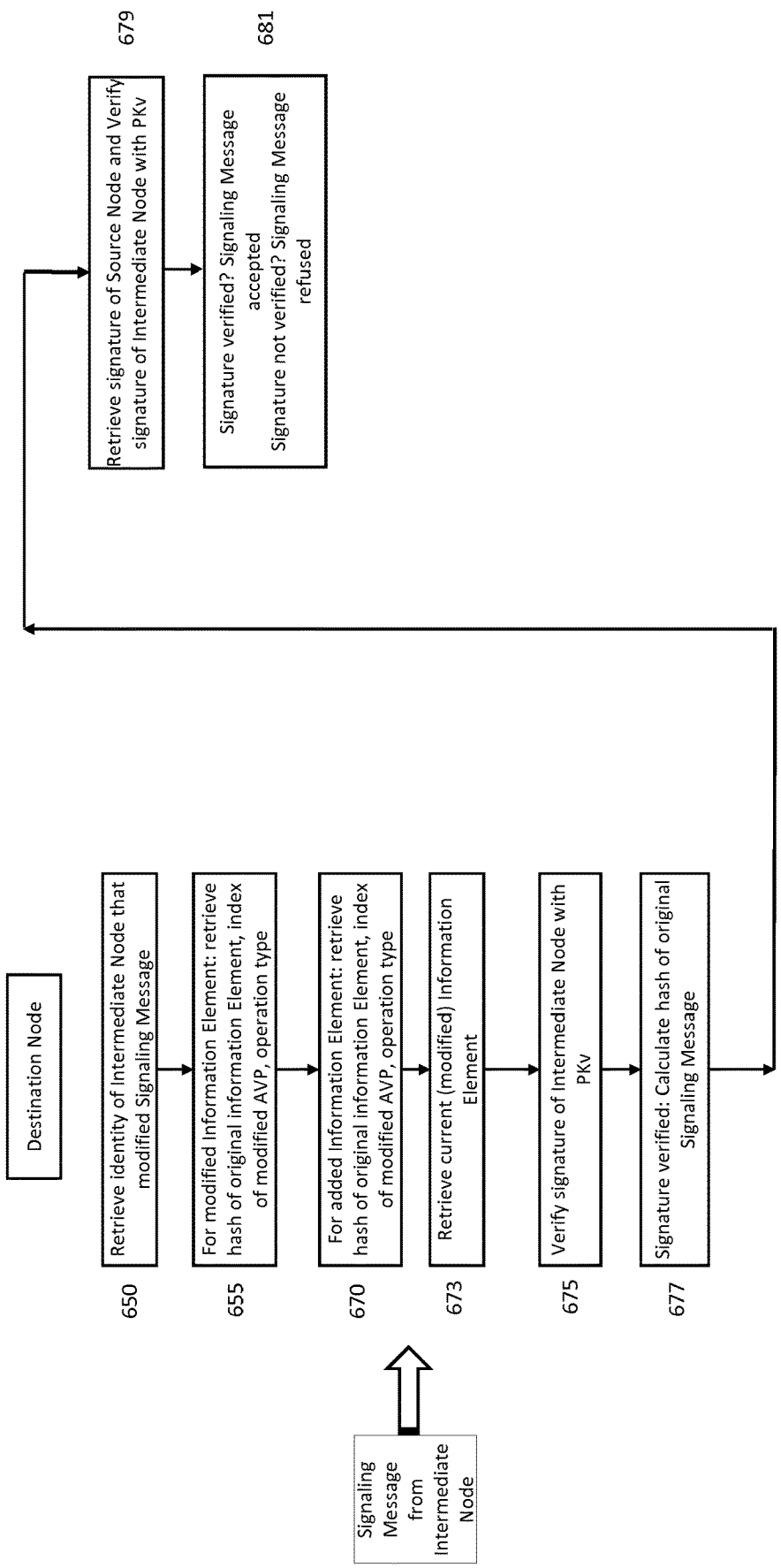

The main actions performed by the intermediate node IPX-A and the destination node are schematized in FIGS. 6A-6B.

The SDM $SDM_{IPX-A}$ of node IPX-A receives the signed ULR signaling message sent by the SDM $SDM_{PLMN-A}$ of the first PLMN PLMN-A and firstly verifies the validity of the signature $\sigma_{PLMN-A}$ of the first PLMN PLMN-A, as described in the previous examples (action 605).

If the signature $\sigma_{PLMN-A}$ is valid, then the SDM $SDM_{IPX-A}$ replaces the original value "username$_{original-value}$" within the AVP "User-Name" received from the SDM $SDM_{PLMN-A}$ with the new value "username$_{modified-value}$" (action 610).

The SDM $SDM_{IPX-A}$ also adds a new AVP, for example a vendor-specific AVP, named "AVPNew" (action 615), assigning an index thereto.

The SDM $SDM_{IPX-A}$ firstly hashes individually the replaced AVP and the added AVP (action 620), to obtain the two hashes Hash(username$_{modified-value}$) and Hash(AVP-New), and then the SDM $SDM_{IPX-A}$ hashes again each single hash together with the respective AVP index (action 625) as shown below:

$H_{IPX-A}$=(index$_{AVP-Username}$∥
Hash(username$_{modified-value}$)∥index$_{AVPNew}$∥
Hash(AVPNew)).

The calculated hash $H_{IPX-A}$ is then digitally signed by node IPX-A (action 630):

$\sigma_{IPX-A}$=Sign($H_{IPX-A}$,Identity of $SDM_{IPX-A}$;SKs;$PKv$).

In the digital signature computation also a value (e.g. a sequence number or a timestamp) is preferably used to avoid replay-attacks.

This new signature $\sigma_{IPX-A}$ is appended to the signaling message ULR (action 635) in the grouped AVP "Signatures" as a new atomic AVP of type "Signature" with, for example, the node identity and, if needed, a timestamp.

The SDM $SDM_{IPX-A}$ also calculates the hash of the original value "username$_{original-value}$" of the modified AVP "User-Name" (action 640):

$h_{original-value-username}$=hash(username$_{original-value}$).

The SDM $SDM_{IPX-A}$ builds a grouped AVP "ModifiedAVPs" containing its identity and two AVPs of type "ModifiedAVP", each one containing respectively:

$h_{original-value-username}$, index$_{AVP-username}$ and the type of operation set to 'replacement';

$h_{AVPNew}$=Hash(AVPNew), index$_{AVPNew}$ and the type of operation set to 'addition'.

This grouped AVP "ModifiedAVPs", containing the two AVPs of type "ModifiedAVP", is appended to the ULR signaling message (action 645) and the new ULR signaling message sent out by the SDM $SDM_{IPX-A}$ is now composed by:

Vendor-Specific-Application-Id (unchanged value)
Auth-Session-State (unchanged value)
Origin-Host (unchanged value)
Origin-Realm (unchanged value)
Destination-Host (unchanged value)
Destination-Realm (unchanged value)
User-Name (new value)
OC-Supported-Features (unchanged value)
Supported-Features (unchanged value)
Terminal-Information (unchanged value)
RAT-Type (unchanged value)
ULR-Flags (unchanged value)
UE-SRVCC-Capability (unchanged value)
Visited-PLMN-Id (unchanged value)
SGSN-Number (unchanged value)
Homogeneous-Support-of-IMS-Voice-Over-PS-Sessions (unchanged value)
GMLC-Address (unchanged value)
Active-APN (unchanged value)
Equivalent-PLMN-List (unchanged value)
MME-Number-for-MT-SMS (unchanged value)
SMS-Register-Request (unchanged value)
SGs-MME-Identity (unchanged value)
Coupled-Node-Diameter-ID (unchanged value)
Poxy-Info (unchanged value)
Route-Record (unchanged value)
AVPNew (new AVP)
ModifiedAVPs (identity of IPX-A, AVP of type "ModifiedAVP" containing $h_{original-value-username}$, index$_{AVP-Username}$, 'replacement', AVP of type "ModifiedAVP" containing $h_{AVPNew}$, index$_{AVPNew}$, 'addition')
Signatures ($\sigma_{PLMN-A}$, $\sigma_{IPX-A}$)

The grouped AVP "Signatures" is composed of multiple Signature AVPs. The last appended signature (signature $\sigma_{IPX-A}$ of node IPX-A) can be identified on a per index basis or using a timestamp or using the identity of the signing node, as detailed in the previous examples.

Node IPX-B does not perform any message manipulation and just forwards it to the SDM $SDM_{PLMN-B}$ of the second PLMN PLMN-B. The SDM $SDM_{PLMN-B}$ receives the ULR signaling message and verifies the signatures available in the grouped AVP "Signatures", as described below:

1. The SDM $SDM_{PLMN-B}$ checks the existence of the grouped AVP "ModifiedAVPs" in the received ULR signaling message. If the grouped AVP "ModifiedAVPs" exists, then the SDM $SDM_{PLMN-B}$ retrieves from the grouped AVP "ModifiedAVPs" the identity of the node IPX-A (action 650) and for each single AVP available in the grouped AVP "ModifiedAVPs", the SDM $SDM_{PLMN-B}$ retrieves the hash, the index of such single AVP in the signaling message and the operation type. In particular, in the considered example, the SDM $SDM_{PLMN-B}$ retrieves the first AVP "ModifiedAVP", in this example relating to the replaced AVP "User-Name", from which it extracts the AVP index index$_{AVP-username}$, the hash $h_{original-value-username}$ and the operation type 'replacement' (action 655). Then the SDM $SDM_{PLMN-B}$ retrieves the second AVP ModifiedAVP, from which it extracts the AVP index index$_{AVPNew}$, the hash $h_{AVPNew}$ and the operation type 'addition' (action 670).

2. Then, since for the AVP "User-Name" the operation type is 'replacement', by means of the AVP index index$_{AVP-username}$ the SDM $SDM_{PLMN-B}$ retrieves the current value of the changed AVP (i.e., the value username$_{modified-value}$) (action 673) and calculates the hash $h_{modified-value-username}$. Since for the second AVP AVPNew the operation is 'addition', the SDM $SDM_{PLMN-B}$ just uses the retrieved hash $h_{AVPNew}$ and finally calculates the expected hash:

expected-$h_{IPX-A}$=(index$_{AVP-username}$∥
$h_{modified-value-username}$∥index$_{AVPNew}$∥$h_{AVPNew}$).

3. The SDM $SDM_{PLMN-B}$ retrieves from the grouped AVP "Signatures" the signature $\sigma_{IPX-A}$ of IPX node IPX-A using the node IPX-A identity retrieved from the grouped AVP "ModifiedAVPs" and verifies the signature (action 675):

Verify($\sigma_{IPX-A}$,expected-$h_{IPX-A}$;$PKv$)

4. If this verification is successful, then the SDM $SDM_{PLMN-B}$ calculates the hash of the original ULR signaling message (action 677):

$$h_{original-message}=\text{Hash}(\text{index}_1\|\text{Hash}(\text{AVP}_{index1})$$
$$\|\text{index}_2\|\text{Hash}(\text{AVP}_{index2})\|\ldots\|$$
$$\text{index}_{AVP-Username}\|h_{original-value-username}\|\ldots$$
$$\|\text{index}_N\|\text{Hash}(\text{AVP}_{indexN}))$$

and verifies the signature of the first PLMN PLMN-A (action 679):

$$\text{Verify}(\sigma_{PLMN-A}, h_{original-message}, PKv)$$

as in Example 2.

Finally, if this verification is also successful, the ULR signaling message is accepted, otherwise it is refused (action 681).

Example 4: MME Generated Signaling Message Only Protected in Terms of Authenticity and Integrity; Changes (Change of AVP Value Plus Addition of AVP Plus Deletion of AVP) Performed During the Transit This example is equal to Example 3, with the difference that node IPX-A performs three different operations: a change of the value of an existing AVP, an addition of a new AVP and a deletion of an existing AVP.

All the steps performed by the first PLMN PLMN-A are skipped and this description is focused only on the operations and the verification phase performed by node IPX-A and the second PLMN PLMN-B.

The SDM $SDM_{IPX-A}$ of node IPX-A receives the signed ULR signaling message sent by the SDM $SDM_{PLMN-A}$ of the first PLMN PLMN-A and firstly verifies the validity of the signature $\sigma_{PLMN-A}$ as described in previous examples.

If the signature $\sigma_{PLMN-A}$ is valid, then the SDM $SDM_{IPX-A}$ replaces the original value "username$_{original-value}$" within the AVP "User-Name" received from $SDM_{PLMN-A}$ with the new value "username$_{modified-value}$".

The SDM $SDM_{IPX-A}$ also adds to the ULR signaling message a new AVP, for example a vendor-specific AVP named "AVPNew" and deletes an existing AVP, for example the AVP "Terminal-Information" (with value "terminal-info$_{original-value}$").

The SDM $SDM_{IPX-A}$ firstly hashes individually the replaced AVP, the added AVP and the deleted AVP, then the SDM $SDM_{IPX-A}$ hashes again each single hash together with the index of the respective AVP, as shown below:

$$H_{IPX-A}=(\text{index}_{AVP-Username}\|\text{Hash}(\text{user-name}_{modified-value})\|\text{index}_{AVP-terminal-Information}$$
$$\|\text{Hash}(\text{terminal-info}_{original-value})\|\text{index}_{AVPNew}$$
$$\|\text{Hash}(\text{AVPNew}))$$

The hash $H_{IPX-A}$ is digitally signed:

$$\sigma_{IPX-A}=\text{Sign}(H_{IPX-A}, \text{Identity of } SDM_{IPX-A}; SKs; PKv)$$

In the computation of the digital signature also a value (e.g. a sequence number or a timestamp) is preferably used to avoid replay-attacks.

This new signature $\sigma_{IPX-A}$ is appended in the grouped AVP "Signatures" as a new atomic AVP of type "Signature" with the identity of node IPX-A.

The SDM $SDM_{IPX-A}$ also calculates the hash $h_{original-value-username}$ of the original value "username$_{original-value}$" of the modified AVP "User-Name":

$$h_{original-value-username}=\text{hash}(\text{username}_{original-value})$$

The SDM $SDM_{IPX-A}$ builds a grouped AVP "ModifiedAVPs" containing its identity and three AVPs of type "ModifiedAVP", each one containing respectively:

$h_{original-value-username}$, $\text{index}_{AVP-Username}$ and the type of operation set to 'replacement';

$h_{AVPNew}=\text{Hash}(\text{AVPNew})$, $\text{index}_{AVPNew}$ and the type of operation set to 'addition', $h_{original-value-terminal-info}=\text{Hash}(\text{terminal-info}_{original-value})$, $\text{index}_{AVP-terminal-info}$ and the type of operation set to 'deletion'.

The grouped AVP "ModifiedAVPs" is appended to the ULR signaling messages and the new ULR sent out by $SDM_{IPX-A}$ is now composed by:

Vendor-Specific-Application-Id (unchanged value)
Auth-Session-State (unchanged value)
Origin-Host (unchanged value)
Origin-Realm (unchanged value)
Destination-Host (unchanged value)
Destination-Realm (unchanged value)
User-Name (new value)
OC-Supported-Features (unchanged value)
Supported-Features (unchanged value)
RAT-Type (unchanged value)
ULR-Flags (unchanged value)
UE-SRVCC-Capability (unchanged value)
Visited-PLMN-Id (unchanged value)
SGSN-Number (unchanged value)
Homogeneous-Support-of-IMS-Voice-Over-PS-Sessions (unchanged value)
GMLC-Address (unchanged value)
Active-APN (unchanged value)
Equivalent-PLMN-List (unchanged value)
MME-Number-for-MT-SMS (unchanged value)
SMS-Register-Request (unchanged value)
SGs-MME-Identity (unchanged value)
Coupled-Node-Diameter-ID (unchanged value)
Poxy-Info (unchanged value)
Route-Record (unchanged value)
AVPNew (new AVP)
ModifiedAVPs (identity of node IPX-A, AVP ModifiedAVP containing $h_{original-value-username}$, $\text{index}_{AVP-Username}$, 'replacement', AVP ModifiedAVP containing $h_{AVPNew}$, $\text{index}_{AVPNew}$, 'addition', AVP ModifiedAVP containing $h_{original-value-terminal-info}$, $\text{index}_{AVP-terminal-info}$, 'deletion')
Signatures ($\sigma_{PLMN-A}$, $\sigma_{IPX-A}$)

The grouped AVP "Signatures" is composed of multiple "Signature" AVPs. The last appended signature (signature of node IPX-A) can be identified on a per index basis or using a timestamp or including the identity of the signing node, as detailed in the previous example.

Node IPX-B does not perform any manipulation on the message and just forwards it to the SDM $SDM_{PLMN-B}$ of the second PLMN PLMN-B. The SDM $SDM_{PLMN-B}$ receives the ULR signaling message and verifies the signatures available in the grouped AVP "Signatures", as described below:

1. The SDM $SDM_{PLMN-B}$ checks the existence in the received ULR signaling message of the grouped AVP "ModifiedAVPs". If the grouped AVP "ModifiedAVPs" exists, then the SDM $SDM_{PLMN-B}$ retrieves from the grouped AVP "ModifiedAVPs" the identity of node IPX-A and for each single AVP available in this grouped AVP, the hash, the index of this AVP in the signaling message ULR and the operation type. In particular, the SDM $SDM_{PLMN-B}$ retrieves the first AVP "ModifiedAVP" in the grouped AVP "ModifiedAVPs", in this example the AVP "User-Name"

relating to the replaced AVP "User-Name", from which it extracts the AVP index $\text{index}_{AVP\text{-}username}$, the hash $h_{original\text{-}value\text{-}username}$ and the operation type 'replacement'. Then the SDM $\text{SDM}_{PLMN\text{-}B}$ retrieves the second AVP "ModifiedAVP", from which it extracts the AVP index $\text{index}_{AVPNew}$, the hash $h_{AVPNew}$ and the operation type 'addition'; finally, the SDM $\text{SDM}_{PLMN\text{-}B}$ retrieves the third AVP "ModifiedAVP", from which it extracts the AVP index $\text{index}_{AVP\text{-}terminal\text{-}info}$, the hash $h_{AVP\text{-}terminal\text{-}info}$ and the operation type 'deletion'.

2. Then, since for the AVP "User-Name" the operation type is 'replacement', by means of the respective AVP index $\text{index}_{AVP\text{-}username}$, the SDM $\text{SDM}_{PLMN\text{-}B}$ retrieves from the ULR signaling message the current value $\text{username}_{modified\text{-}value}$ of the changed AVP and calculates the hash $h_{modified\text{-}value\text{-}username}$. Since for the second and third AVPs "AVPNew" and "Terminal-Information" the operation is 'addition' and 'deletion', respectively, the SDM $\text{SDM}_{PLMN\text{-}B}$ just uses the retrieved hashes and the respective indexes. So, the SDM $\text{SDM}_{PLMN\text{-}B}$ calculates the expected hash;

$$\text{expected-}h_{IPX\text{-}A} = (\text{index}_{AVP\text{-}username}$$
$$\|h_{modified\text{-}value\text{-}username}$$
$$\|\text{index}_{AVP\text{-}terminal\text{-}info}\|h_{AVP\text{-}terminal\text{-}info}$$
$$\|\text{index}_{AVPNew}\|h_{AVPNew}).$$

3. The SDM $\text{SDM}_{PLMN\text{-}B}$ retrieves from the grouped AVP "Signatures" the signature σIPX-A of node IPX-A using the node identity retrieved from the grouped AVP "ModifiedAVPs" and verifies the signature:

$$\text{Verify}(\sigma_{IPX\text{-}A}, \text{expected-}h_{IPX\text{-}A}; PKv)$$

4. If this verification is successful, then the SDM $\text{SDM}_{PLMN\text{-}B}$ calculates the hash $h_{original\text{-}message}$ of the original ULR signaling message:

$$h_{original\text{-}message} = \text{Hash}(\text{index}_1\|\text{Hash}(AVP_{index1})$$
$$\|\text{index}_2\|\text{Hash}(AVP_{index2})\| \ldots \|$$
$$\text{index}_{AVP\text{-}Username}\|h_{original\text{-}value\text{-}username}\| \ldots$$
$$\|\text{index}_{AVP\text{-}terminal\text{-}info}\|h_{AVP\text{-}terminal\text{-}info}\| \ldots$$
$$\|\text{index}_N\|\text{Hash}(AVP_{indexN}))$$

and verifies the signature of the first PLMN PLMN-A:

$$\text{Verify}(\sigma_{PLMN\text{-}A}, h_{original\text{-}message}; PKv)$$

Inserting, in the calculation of the hash $h_{original\text{-}message}$ of the original ULR signaling message, the hash of the deleted AVP "Terminal Info" and fixing the indexes of the unchanged AVPs if needed.

Finally, if this verification is also successful, the ULR signaling message is accepted.

Example 5: MME Generated Signaling Message Only Protected in Terms of Authenticity and Integrity; Changes Performed During the Transit by Two Intermediate Nodes This example is equal to Example 3, with the difference that also node IPX-B performs an operation on an AVP added by node IPX-A.

All the steps performed by the first PLMN PLMN-A and by node IPX-A are skipped and this description is focused only on the operations and the verification phase performed by node IPX-B and the second PLMN PLMN-B. Details on the tasks performed by the first PLMN PLMN-A and by node IPX-A are provided in the description of the previous examples.

The SDM $\text{SDM}_{IPX\text{-}B}$ of node IPX-B receives the signed ULR signaling message sent by the SDM $\text{SDM}_{IPX\text{-}A}$ of node IPX-A and firstly verifies the validity of the signatures $\sigma_{IPX\text{-}A}$ and $\sigma_{PLMN\text{-}A}$ of node IPX-A and of the first PLMN PLMN-A, respectively, as described in previous examples.

If both signatures $\sigma_{IPX\text{-}A}$ and $\sigma_{PLMN\text{-}A}$ are valid, then the SDM $\text{SDM}_{IPX\text{-}B}$ replaces the value "$\text{username}_{modified\text{-}value}$" within the AVP "User-Name" in the ULR signaling message received from the SDM $\text{SDM}_{IPX\text{-}A}$ with the new value "$\text{username}_{modified\text{-}value\text{-}IPX\text{-}B}$".

The SDM $\text{SDM}_{IPX\text{-}B}$ hashes individually the replaced AVP "User-Name" and then hashes again this hash together with the index of the modified AVP "User-Name" as shown below:

$$H_{IPX\text{-}B} = (\text{index}_{AVP\text{-}Username}\|\text{Hash}(\text{username}_{modified\text{-}value\text{-}IPX\text{-}B})).$$

The hash $H_{IPX\text{-}B}$ is then digitally signed:

$$\sigma_{IPX\text{-}B} = \text{Sign}(H_{IPX\text{-}B}, \text{Identity of SDM}_{IPX\text{-}B}; SKs; PKv).$$

In the digital signature computation also a value (e.g. a sequence number or a timestamp) is preferably used to avoid replay-attacks.

This new signature $\sigma_{IPX\text{-}B}$, with the identity of node $\text{SDM}_{IPX\text{-}B}$, is appended to the ULR signaling message in the grouped AVP "Signatures" as a new atomic AVP of type "Signature".

Since the SDM $\text{SDM}_{IPX\text{-}B}$ of node IPX-B changes an AVP already modified (by node IPX-A), it just retrieves the hash $h_{modified\text{-}value\text{-}username}$, (i.e., the hash of the value of the original AVP "User-Name" changed by IPX-A).

The SDM $\text{SDM}_{IPX\text{-}B}$ builds a further grouped AVP "ModifiedAVPs" containing the identity of the SDM $\text{SDM}_{IPX\text{-}B}$ and an AVP of type "ModifiedAVP", containing:

$h_{modified\text{-}value\text{-}username}$, $\text{index}_{AVP\text{-}username}$ and the type of operation set to "replacement".

This further grouped AVP "ModifiedAVPs" is appended to the ULR signaling messages and the new ULR signaling message sent out by the SDM $\text{SDM}_{IPX\text{-}B}$ is now composed by:

Vendor-Specific-Application-Id (unchanged value)
Auth-Session-State (unchanged value)
Origin-Host (unchanged value)
Origin-Realm (unchanged value)
Destination-Host (unchanged value)
Destination-Realm (unchanged value)
User-Name (new value set by IPX-B)
OC-Supported-Features (unchanged value)
Supported-Features (unchanged value)
RAT-Type (unchanged value)
ULR-Flags (unchanged value)
UE-SRVCC-Capability (unchanged value)
Visited-PLMN-Id (unchanged value)
SGSN-Number (unchanged value)
Homogeneous-Support-of-IMS-Voice-Over-PS-Sessions (unchanged value)
GMLC-Address (unchanged value)
Active-APN (unchanged value)
Equivalent-PLMN-List (unchanged value)
MME-Number-for-MT-SMS (unchanged value)
SMS-Register-Request (unchanged value)
SGs-MME-Identity (unchanged value)
Coupled-Node-Diameter-ID (unchanged value)
Poxy-Info (unchanged value)
Route-Record (unchanged value)
AVPNew (new AVP)
ModifiedAVPs (identity of IPX-A, AVP ModifiedAVP containing $h_{original\text{-}value\text{-}username}$, $\text{index}_{AVP\text{-}Username}$, 'replacement', AVP ModifiedAVP containing $h_{AVPNew}$, $\text{index}_{AVPNew}$, 'addition')

ModifiedAVPs (identity of IPX-B, AVP ModifiedAVP containing $h_{modified\text{-}value\text{-}username}$, $index_{AVP\text{-}Username}$, 'replacement')

Signatures ($\sigma_{PLMN\text{-}A}$, $\sigma_{IPX\text{-}A}$, $\sigma_{IPX\text{-}B}$)

The grouped AVP "Signatures" is composed of multiple "Signature" AVPs that include the signature and the identity of the node IPX-B (in addition to those of the first PLMN PLMN-A and of IPX node IPX-A). As detailed in the previous example, the last appended signature $\sigma_{IPX\text{-}B}$ can be identified on a per index basis or using a timestamp or the identity of the signing node is also included.

The SDM $SDM_{PLMN\text{-}B}$ in the second PLMN PLMN-B receives the ULR signaling message from IPX node IPX-B and verifies the digital signatures available in the grouped AVP "Signatures":

1. The SDM $SDM_{PLMN\text{-}B}$ checks the existence in the received ULR signaling message of one or more grouped AVPs "ModifiedAVPs". If at least one AVP "ModifiedAVPs" exists, iteratively on each one, the SDM $SDM_{PLMN\text{-}B}$ retrieves the identity of the node performing the operation, retrieves the AVP(s) "ModifiedAVP" in the grouped AVP "ModifiedAVPs" and for each AVP "ModifiedAVP" the SDM $SDM_{PLMN\text{-}B}$ retrieves the hash, the index of this AVP in the ULR signaling message and the operation type performed on such AVP. In particular, assuming that the SDM $SDM_{PLMN\text{-}B}$ starts from the first grouped AVP "ModifiedAVPs" corresponding to the manipulations performed by IPX node IPX-A, the SDM $SDM_{PLMN\text{-}B}$ performs the same steps described in the Example 3 above and verifies the signature of IPX node IPX-A. Then the SDM $SDM_{PLMN\text{-}B}$ moves to the second grouped AVP "ModifiedAVPs" and performs the same steps to verify the signature of IPX node IPX-B.

2. If both verifications are successful, then the SDM $SDM_{PLMN\text{-}B}$ shall calculate the hash $h_{original\text{-}message}$ of the original ULR signaling message. In that case, the SDM $SDM_{PLMN\text{-}B}$ shall understand (using the AVP index) that the AVP changed by IPX node IPX-B corresponds to the AVP already changed by IPX node IPX-A and then the SDM $SDM_{PLMN\text{-}B}$ can use the hash value $h_{original\text{-}value\text{-}username}$ retrieved from the first grouped AVP "ModifiedAVPs". At the end, the SDM $SDM_{PLMN\text{-}B}$ calculates the hash of the original ULR signaling message:

$$h_{original\text{-}message} = \text{Hash}(index_1 \| \text{Hash}(AVP_{index1}) \\ \| index_2 \| \text{Hash}(AVP_{index2}) \| index_{AVP\text{-}Username} \\ \| h_{original\text{-}value\text{-}username} \| \ldots \| index_N \| \text{Hash}(AVP_{indexN}))$$

and verifies the signature of PLMN-A:

$$\text{Verify}(\sigma_{PLMN\text{-}A}, h_{original\text{-}message}, PKv),$$

Finally, if this verification is also successful, the ULR signaling message is accepted.

If IPX node IPX-B changes an AVP which was not previously modified by IPX node IPX-A, then the hash $h_{original\text{-}message}$ of the original ULR signaling message shall be constructed retrieving from the grouped AVP "ModifiedAVPs" set by node IPX-B the correct hash of the original value of the changed AVP.

Solution Applied to Objective B

E2E Message Confidentiality Protection in Hop-by-Hop Communication Links

In general, let a hop-by-hop communication link between any two network nodes of a communication network like that depicted in FIG. 3 be considered. In particular, let a hop-by-hop communication link between (a node in) the first PLMN PLMN-A and (a node in) the second PLMN PLMN-B be considered, with intermediate nodes IPX-A and IPX-B (of the IPX Ecosystem) in between. According to embodiments of the solution disclosed herein, the desired message confidentiality can be achieved by using Attribute-Based Encryption (ABE).

The source node (e.g., in the first PLMN PLMN-A) generates signaling messages composed of a sequence of Information Elements (e.g., AVPs) and sends them to the destination node (e.g., in the second PLMN PLMN-B) as a whole. Only specified intermediate nodes (IPX-A or IPX-B) are authorized to read the (Information Elements of the) received signaling messages. The end (destination) node is always authorized to read every signaling message.

Each node along the communication link inserting a new Information Element (particularly, the source node and any intermediate node) can specify if this new Information Element is confidential or not and, if yes, which further node(s) along the communication link is (are) authorized to read it. The authorized node(s) is (are) specified/characterized in terms of attributes and access policies, which may include node names (nodes identities). For Information Element confidentiality, each such node needs to appropriately encrypt the inserted Information Element. The originally sent Information Elements are regarded as inserted by the source node.

The attributes used for specifying/characterizing the authorized nodes can include the authorized nodes' attributes as well as the Information Elements attributes. In particular, the node attributes can include the domain or node names, possibly along with the expiry time/date of the node private signing key SKs. If the access policy is defined as a disjunction of attributes, then a node is authorized to read the Information Elements of a received signaling message if and only if at least one of the attributes is satisfied. If the access policy is defined as a conjunction of attributes, then a node is authorized to read the Information Elements of a received signaling message if and only if all the attributes are satisfied. In principle, one can use both CP-ABE and KP-ABE for encryption. However, for the compatibility with ABS used for Information Elements integrity, CP-ABE is preferable. This means that the access policy would be embedded in the encryption of Information Elements, whereas an attribute set would be embedded in the private decryption key SKd of a node. A node is then authorized to decrypt the Information Elements of a received signaling message if and only if its attribute set satisfies the embedded access policy. Consequently, the nodes authorized to read a confidential Information Elements are specified/characterized by the access policy which is a part of the encrypted Information Elements.

As discussed in the foregoing, ABE is essentially used for establishing a randomized shared secret key, which itself is then used for symmetric-key encryption of data (e.g., by using the National Institute of Standards and Technology (NIST) standard AES, as described in NIST, "Advanced Encryption Standard (AES)", Federal Information Processing Standard (FIPS) Publication 197, November 2001). In practice, for encrypting a number of messages (with the same embedded access policy in CP-ABE or the same embedded attribute set in KP-ABE), the randomization parameter used in the encryption of different messages can be repeated for simplicity, to minimize the ciphertext overhead. However, this will result in the same shared secret key. Preferably, different symmetric keys for the symmetric-key encryption of these messages can then be obtained by applying a (known) key derivation function to the (same) shared secret key and unrepeated public parameters (nonces).

Solution Applied to Objective C

E2E Combined Message Integrity & Confidentiality Protection in General Hop-by-Hop Communication Links Let a general hop-by-hop communication link involving an arbitrary number of intermediate nodes (like IPX nodes IPX-A and IPX-B) between a source node and a destination node be considered. According to embodiments of the solution disclosed herein, the desired combined message integrity & confidentiality can be achieved by using Attribute-Based Encryption (ABE), cryptographic hash functions, and Attribute-Based Signatures (ABS). ABE and ABS can possibly be implemented as a combined Attribute-Based Encryption & Signature scheme (ABES).

Firstly, let a simplified scenario be considered, which is defined by integrating Information Element integrity (as discussed in the solution applied to Object A) in the solution applied to Object B described in the foregoing, by allowing only the nodes authorized to read confidential encrypted Information Elements (e.g., AVPs in Diameter) to modify them after decryption and then re-encrypt them. This implies that the Information Elements that are not flagged as confidential cannot be modified but can be inserted also by intermediate nodes. In the re-encryption by CP-ABE, the same (or a consistent) access policy needs to be used. If the same randomization parameter is used in the re-encryption, then a fresh symmetric key for the symmetric-key encryption can be obtained by using a public key derivation function and a fresh nonce, as pointed out earlier.

The Information Elements integrity with traceability of changes can then be achieved by using the hash functions and digital signatures in essentially the same way as described in the solution applied to Object A, described in the foregoing. In order to also allow the other nodes, which are not authorized to read confidential information Elements, to verify their integrity, the integrity should relate to encrypted Information Elements. Hence the hash values used for verifying the integrity of the Information Elements are computed on confidential (encrypted) Information Elements. This ensures the integrity of confidential Information Elements and traceability of their changes including insertions and modifications by using digital signatures. In addition, the integrity of inserted unconfidential (and unmodified) Information Elements is also ensured by digital signatures. If the integrated CP-ABES scheme is used, then the private signing key SKs can be the same as the private decryption key SKd, for any node on the link.

More generally, also the integrity of modified unconfidential Information Elements can be protected. For such Information Elements, the hash values are computed on the Information Elements themselves (i.e., without encrypting the Information Elements), as in the solution applied to Object A. The rest is the same as above.

Finally, in the most general scenario of Object C, each node generating a new, inserted Information Element can specify not only if the Information Element is confidential, and, if yes, which further nodes along the communication link are authorized to read it, but such node can also specify which further node(s) along the communication link is (are) authorized to modify it. The authorized node(s) can be specified/characterized in terms of attributes and access policies, which may include node identities. The authorizations for reading and modification of Information Elements can be different but should satisfy a natural constraint that a node authorized to modify a confidential Information Element should also be authorized to read it. This scenario thus effectively allows one to forbid some Information Elements, confidential or not, to be modified by some nodes. Firstly, the confidentiality of the Information Elements should be protected in the same way as in the solution applied to Object B. Secondly, the integrity of confidential Information Elements should be protected as in the solution applied to Object A but on the Information Elements in the encrypted form, as explained above.

In the ciphertext-policy approach, the nodes authorized to modify an Information Element can be specified/characterized by an access policy appended to the signaling message by the node inserting the Information Element(s), along with the attribute sets which are associated with the nodes. The appended access policy is considered as a part of the signaling message, which is not confidential. In particular, similarly as in CP-ABE or CP-ABES, the attribute sets can include domain or node names as well as the expiry times/dates of the node private signing keys issued by a KMS. A node is then authorized to modify the Information Element if and only if its attributes satisfy the specified access policy. The Information Element, together with the appended modification access policy, is then hashed and authenticated by a digital signature of the node inserting the Information Element. If the Information Element is confidential, it is then encrypted, but not the appended modification access policy. The absence of the appended modification access policy would mean that any node is authorized to modify that Information Element.

The signaling message integrity can then be ensured and verified by a similar process as in the solution applied to Object A. The difference is that the digital signatures for each change in the sequence of Information Elements (i.e., when some Information Elements are inserted or modified, where deletion of an Information Element is regarded as a modification) should be valid under the access policy that is compliant with each modification access policy appended to any modified Information Element, and this appended access policy should be verified as authentic when verifying the corresponding digital signature by the node that inserted this Information Element. So, the role of ABS is important for this general scenario.

Consequently, the signaling message integrity verification is successful if and only if all the digital signatures are verified as valid. This means that the received sequence of Information Elements is authentic and that all the changes made to Information Elements (due to Information Element insertions or modifications) are authentic and compliant with the specified modification access policies for individual Information Elements. All the Information Elements changes are traceable to these policies, and if they relate to node identities, then the Information Elements changes are traceable to node identities.

The invention claimed is:

1. A method of protecting signaling messages in a hop-by-hop network communication link between a source node in the network and a destination node in the network, the communication link including at least one intermediate node in the network between the source node and the destination node, the method comprising:

providing the source node with a source node public digital signature verification key and a respective source node private digital signature key associated with said public digital signature verification key;

providing the destination node with said source node public digital signature verification key associated with the source node private digital signature key;

at the source node:
building a signaling message including a sequence of Information Elements;
for each Information Element, calculating an Information Element hash value of the Information Element;
calculating a sequence hash value of a concatenation of the calculated Information Element hash values;
generating a source node digital signature by digitally signing the calculated sequence hash value, said digitally signing comprising exploiting the source node private digital signature key and the source node public digital signature verification key;
including the source node digital signature in the signaling message; and
sending the signaling message;

at the intermediate node:
receiving the signaling message and forwarding the signaling message to the destination node directly or via a next intermediate node; and at the destination node:
receiving the signaling message,
wherein the private digital signature keys of the source node and said intermediate nodes are all associated with the same public digital signature verification key, according to an Attribute-Based Signature, ABS, scheme, particularly to an Identity-Based Signature, IBS, scheme,
wherein in said building a signaling message a respective unique index is assigned to each of said Information Elements, the index assigned to an Information Element being able to identify that Information Element in the sequence, wherein said calculating an Information Element hash value includes calculating a hash value of the Information Element plus the unique index assigned thereto, and wherein said including the source node digital signature in the signaling message also includes the indexes of all said Information Elements.

2. The method of claim 1, further comprising:
at the destination node, after said receiving the signaling message:
for each Information Element, calculating a second Information Element hash value of the Information Element;
calculating a second sequence has value of a concatenation of the calculated second Information Element hash values;
verifying the source node digital signature included in the received signaling message by exploiting said source node public digital signature verification key and the second calculated sequence hash value; and
in case the source node digital signature is verified as valid, accepting the received signaling message as authentic, otherwise discarding the received signaling message.

3. The method of claim 1, wherein said at least one intermediate node includes a first intermediate node being an intermediate node next to the source node in said hop-by-hop network communication link, the method further comprising:
providing said first intermediate node with an intermediate node public digital signature verification key and a respective intermediate node private digital signature key associated with said intermediate node public digital signature verification key; and at said first intermediate node, after said receiving and before said forwarding:
for each Information Element, calculating a second Information Element hash value of the Information Element;
calculating a second sequence hash value of a concatenation of the calculated second Information Element hash values;
verifying the source node digital signature included in the received signaling message by exploiting the source node public digital signature verification key and the calculated second sequence hash value;
in case the source node digital signature is verified as valid, making a change to the received signaling message, wherein said making a change includes at least one among modifying at least one Information Element in the sequence or adding to the sequence at least one additional Information Element with an associated unique index able to identify the additional Information Element in the sequence, otherwise, if the source node digital signature is not verified as valid, discarding the received signaling message;
calculating a hash value of the change made to the received signaling message, wherein said calculating a hash value of the change includes calculating an individual hash value of each modified and/or additional Information Element plus the associated indexes, and calculating a sequence hash value of a concatenation of the calculated individual hash values;
generating an intermediate node digital signature by digitally signing the calculated hash value of the change by exploiting the intermediate node private digital signature key and the intermediate node public digital signature verification key;
including the generated digital signature of the hash value of the change in the signaling message, together with the indexes of the modified and/or additional Information Elements;
calculating an individual hash value of the original value of each modified Information Element; and
including in the signaling message data useful to assess the integrity of the signaling message before the change, said data comprising the individual hash value of the original value of each modified Information Element.

4. The method of claim 3, wherein said at least one intermediate node includes, in addition to said first intermediate node, a further intermediate node next to a preceding intermediate node in said hop-by-hop network communication link, the method further comprising:
providing said further intermediate node with the source node public digital signature verification key and the public digital signature verification keys of all the previous intermediate nodes in said hop-by-hop network communication link;
providing said further intermediate node with a further intermediate node public digital signature verification key and a further intermediate node private digital signature key associated with said further intermediate node public digital signature verification key;
at said further intermediate node, after said receiving and before said forwarding:

a) extracting from the received signaling message all said generated digital signatures together with all said indexes of the modified and/or additional Information Elements respectively associated with said generated digital signatures, wherein said digital signatures have been generated by said previous intermediate nodes in said hop-by-hop network communication link and by the source node;

b) extracting from the received signaling message said data useful to assess the integrity of the signaling message before the change, for each said digital signature of the hash value of the change in the signaling message generated by a previous intermediate node;

c) for each Information Element in the received signaling message with an index associated with a last generated digital signature, calculating an Information Element hash value of the Information Element;

d) calculating a last hash value of the change, as the hash value of a concatenation of the calculated Information Element hash values;

e) verifying said last generated digital signature included in the received signaling message by exploiting the respective previous intermediate node public digital signature verification key and said last hash value of the change;

f) for each modified Information Element in the received signaling message with an index associated with said last generated digital signature, extracting from said data useful to assess the integrity of the signaling message before the change the individual hash value of the original value of the modified Information Element;

g) calculating a previous hash value of the change, as the hash value of a concatenation of all calculated or extracted Information Element hash values corresponding to the Information Elements with an index associated with a previous, before the last, generated digital signature;

h) verifying said previous, before the last, digital signature included in the received signaling message by exploiting the respective intermediate node or the source node public digital signature verification key and said previous hash value of the change; and i) iterating operations f) to h) for verifying all said generated digital signatures present in the received signaling message;

in case all said generated digital signatures present in the received signaling message are verified as valid, making a further change to said received signaling message, wherein said making a further change includes at least one among further modifying at least one Information Element in the sequence or adding to the sequence at least one further additional Information Element with an associated unique index able to identify the further additional Information Element in the sequence, otherwise discarding the received signaling message;

calculating a hash value of the further change made to the received signaling message, wherein said calculating a hash value of the further change includes calculating an individual hash value of each further modified and/or further additional Information Element plus the associated indexes, and calculating a sequence hash value of a concatenation of the further calculated individual hash values;

generating an intermediate node digital signature by digitally signing the calculated hash value of the further change by exploiting the further intermediate node private digital signature key and the further intermediate node public digital signature verification key;

including the generated digital signature of the hash value of the further change in the signaling message, together with the indexes of the further modified and/or further additional Information Elements;

calculating an individual hash value of the previous value of each further modified Information Element; and including in the signaling message data useful to assess the integrity of the signaling message before the further change, said data comprising the individual hash value of the previous value of each further modified Information Element.

5. The method of claim 4, further comprising:
at the destination node, after said receiving the signaling message:
performing the same operations a) to h) performed by the further intermediate nodes for verifying all said generated digital signatures present in the received signaling message, by exploiting the public digital signature verification keys of the respective nodes and the respective iteratively calculated said hash values of the further changes; and
in case all said generated digital signatures are verified as valid, accepting the received signaling message, otherwise discarding the received signaling message.

6. The method of claim 3, wherein said generating a digital signature, before said digitally signing, also comprises concatenating an identity of the signing node to said calculated sequence hash value.

7. The method of claim 3, wherein said including in the signaling message data useful to assess the integrity of the signaling message before the change comprises including in the signaling message an indication of a nature of the change, wherein said indication of the nature of the change is one among an indication of a modification of an Information Element and an indication of the addition of an Information Element.

8. The method of claim 7, wherein said indication of a modification of an Information Element is one among an indication of a modification of the value of an Information Element and an indication of the deletion of an Information Element.

9. The method of claim 3, wherein the intermediate node private digital signature key has embedded therein an intermediate node attribute set including at least one intermediate node attribute of the intermediate node, particularly an identifier of the intermediate node or an expiry time/date of said private digital signature key, and the intermediate node digital signature has embedded therein an access policy satisfied by the attribute set embedded in the intermediate node private digital signature key, particularly an access policy including said identifier of the intermediate node or said expiry time/date of said private digital signature key.

10. The method of claim 9, wherein at least one Information Element contains a modification access policy that needs to be satisfied by a node's attributes in order for said node to be authorized to perform a modification of said Information Element and wherein said modification access policy is compliant with the access policy embedded in the digital signature of said node.

11. The method of claim 1, wherein the source node private digital signature key has embedded therein a source node attribute set including at least one source node attribute of the source node, particularly an identifier of the source node or an expiry time/date of said private digital signature key, and the source node digital signature has embedded therein an access policy satisfied by the attribute set embedded in the source node private digital signature key, particularly an access policy including said identifier of the source node or said expiry time/date of said private digital signature key.

12. A method of protecting signaling messages in a hop-by-hop network communication link between a source node in the network and a destination node in the network, the communication link including at least one intermediate node in the network between the source node and the destination node, the method comprising:

providing the source node and the at least one intermediate node with a public encryption key;

providing the destination node and authorized intermediate nodes among said at least one intermediate node with a private destination node decryption key and respective private intermediate node decryption keys, the decryption keys being associated with the public encryption key, wherein said private destination node decryption key and respective private intermediate node decryption keys have each embedded therein a respective node attribute set including at least one respective node attribute, particularly an identifier of the respective node or an expiry time/date of said private destination node decryption key or private intermediate node decryption key;

at the source node:
encrypting at least one Information Element to obtain an encrypted Information Element, by exploiting the public encryption key and embedding an access policy in said encrypting; and including the encrypted Information Element in a sequence of Information Elements; and at the destination node and said authorized intermediate node:
decrypting the encrypted Information Element exploiting one of the destination node private decryption key and the respective authorized intermediate node private decryption key, to obtain a decrypted Information Element.

13. The method of claim 12, further comprising:
at said authorized intermediate node, after said decrypting the encrypted Information Element exploiting the authorized intermediate node private decryption key:
modifying the decrypted Information Element;
encrypting the Information Element to obtain an encrypted Information Element, by exploiting the public encryption key and embedding an access policy in said encrypting, and including the encrypted Information Element in the sequence of Information Elements; and at the destination node:
decrypting the encrypted modified Information Element exploiting the destination node private decryption key.

14. The method of claim 12, further comprising:
at any intermediate node:
adding a new Information Element;
encrypting the Information Element to obtain an encrypted Information Element, by exploiting the public encryption key and embedding an access policy in said encrypting, and
including the encrypted Information Element in the sequence of Information Elements; and at the destination node:
decrypting the encrypted modified Information Element exploiting the destination node private decryption key.

15. The method of claim 12, wherein said encrypting and decrypting comprise calculating a common shared secret key, which is then used for a symmetric-key encryption and respective decryption by exploiting a symmetric-key cipher.

16. The method of claim 12, wherein said public encryption key and associated private decryption keys are calculated according to an Attribute-Based Encryption, ABE, scheme, particularly to an Identity-Based Encryption, IBE, scheme.

17. The method of claim 16, wherein said ABE and IBE schemes exploit the same public key, for encryption and digital signature verification, and wherein the same private keys provided to the nodes can be used for both digital signatures and decryption.

18. The method of claim 12, wherein said encrypted Information elements are calculated exploiting cryptographic hash functions.

19. The method of claim 12, wherein the signaling messages are Diameter signaling messages, and each of said Information Elements comprises an Attribute Value Pair, AVP.

* * * * *